(12) United States Patent
Brenden et al.

(10) Patent No.: US 9,375,643 B2
(45) Date of Patent: Jun. 28, 2016

(54) SYSTEM AND METHOD FOR ARRANGING AND PRESENTING INTERACTIVE MULTIPLAYER GAME SESSIONS TO AN AUDIENCE

(71) Applicant: KINO LLC, Miami, FL (US)

(72) Inventors: John T. Brenden, Las Vegas, NV (US); Dmitry Kozko, Aventura, FL (US)

(73) Assignee: KINO LLC, Miami, FL (US)

( * ) Notice: Subject to any disclaimer, the term of this patent is extended or adjusted under 35 U.S.C. 154(b) by 0 days.

(21) Appl. No.: 14/449,958

(22) Filed: Aug. 1, 2014

(65) Prior Publication Data

US 2015/0352451 A1 Dec. 10, 2015

Related U.S. Application Data

(60) Provisional application No. 62/009,609, filed on Jun. 9, 2014, provisional application No. 62/009,614, filed on Jun. 9, 2014.

(51) Int. Cl.

| A63F 13/00 | (2014.01) |
| A63F 13/30 | (2014.01) |
| H04N 5/74 | (2006.01) |
| H04L 12/58 | (2006.01) |
| G06F 3/14 | (2006.01) |
| A63F 13/86 | (2014.01) |
| A63F 13/537 | (2014.01) |

(Continued)

(52) U.S. Cl.
CPC .............. *A63F 13/12* (2013.01); *A63F 13/537* (2014.09); *A63F 13/86* (2014.09); *G06F 3/14* (2013.01); *H04L 51/32* (2013.01); *H04N 5/74* (2013.01); *H04N 21/4122* (2013.01); *G06Q 10/10* (2013.01); *G06Q 10/109* (2013.01)

(58) Field of Classification Search
USPC ................................ 463/42; 725/10, 13, 110
See application file for complete search history.

(56) References Cited

U.S. PATENT DOCUMENTS 5,835,715 A * 11/1998 Dahl ............................. 709/209
7,278,920 B1 10/2007 Klamer et al.

(Continued)

FOREIGN PATENT DOCUMENTS

EP 2268025 A1 12/2010

OTHER PUBLICATIONS

International Search Report and Written Opinion mailed Sep. 21, 2015 for Application No. PCT/US2015/034909, 13 pages.

*Primary Examiner* — Masud Ahmed
(74) *Attorney, Agent, or Firm* — Moser Taboada

(57) ABSTRACT

A computer implemented method of presenting pre-show content to movie theater audiences includes receiving requests from an exhibitor, each request identifying a feature presentation, a feature presentation start time, and the length of a pre-show session preceding the feature presentation. At least one multiplayer game for each pre-show session is selected automatically based on at least one of an audience maturity rating of the feature presentation, a genre of the feature presentation, and the availability of other players attending at least one other feature presentation hosted by the same exhibitor at the same or a different location, and/or a different exhibitor at a different location. Optionally, the list of selected games is presented to one or more audiences for voting. Where a game to be played by members of different audiences is scheduled for the same time slot, a single instantiation of the game is presented to the multiple audiences.

29 Claims, 18 Drawing Sheets

(51) Int. Cl.
*H04N 21/41* (2011.01)
*G06Q 10/10* (2012.01)

(56) References Cited

U.S. PATENT DOCUMENTS

| | | | | |
|---|---|---|---|---|
| 7,840,991 | B2 * | 11/2010 | Dusenberry et al. | 725/153 |
| 2002/0054078 | A1 * | 5/2002 | Taniwaki | 345/733 |
| 2002/0073417 | A1 * | 6/2002 | Kondo et al. | 725/10 |
| 2002/0156909 | A1 * | 10/2002 | Harrington | 709/231 |
| 2006/0068917 | A1 | 3/2006 | Snoddy et al. | |
| 2007/0067818 | A1 * | 3/2007 | Hjelm | 725/110 |
| 2009/0292587 | A1 * | 11/2009 | Fitzgerald | 705/10 |
| 2009/0319423 | A1 * | 12/2009 | Kersenbrock | 705/41 |
| 2011/0195790 | A1 | 8/2011 | Konkle | |
| 2011/0271295 | A1 * | 11/2011 | Redmann et al. | 725/13 |
| 2012/0204203 | A1 * | 8/2012 | Vandenbulcke et al. | 725/13 |
| 2013/0103484 | A1 * | 4/2013 | McLaughlin | 705/14.33 |
| 2013/0173364 | A1 * | 7/2013 | Choong Cheng Shien et al. | 705/14.16 |
| 2013/0252733 | A1 | 9/2013 | Dusenberry et al. | |

* cited by examiner

| EXH. | THEATER | FEATURE PRESENTATION START TIME (OR PRE-SHOW DURATION) | | | | |
|---|---|---|---|---|---|---|
| | | $M_1$ | $M_2$ | $M_3$ | $M_4$ | $M_n$ |
| $E_1$ | $T_1$ | 13:20 - 13:40 | 13:00-13:20 | 13:00-13:20 | 13:00-13:20 | 13:00-13:20 |
| | $T_1$ | 14:40-15:00 | 14:40-15:00 | 14:40-15:00 | 14:40-15:00 | 14:40-15:00 |
| | $T_1$ | 22:40-23:00 | 14:40-15:00 | 17:20-18:40 | 18:40-19:00 | 20:40-21:00 |
| | $T_2$ | 22:00-22:20 | 22:00-22:20 | 22:00-22:20 | 22:00-22:20 | 22:00-22:20 |
| $E_2$ | $T_3$ | 13:00-13:20 | 13:00-13:20 | 13:00-13:20 | 13:00-13:20 | 13:00-13:20 |
| | $T_3$ | 22:00-22:20 | 22:00-22:20 | 22:00-22:20 | 22:00-22:20 | 22:00-22:20 |
| | $T_3$ | 14:45-15:25 | 14:45-15:25 | 14:45-15:25 | 14:45-15:25 | 14:45-15:25 |

FIG 6

| Filter Criteria | FEATURE PRESENTION INFORMATION | | | | | | | | | | | |
|---|---|---|---|---|---|---|---|---|---|---|---|---|
| | $M_1$ | $M_2$ | $M_3$ | $M_4$ | $M_5$ | $M_6$ | $M_7$ | $M_8$ | $M_9$ | $M_{10}$ | $M_{11}$ | $M_{12}$ |
| Rating | G | G | PG-13 | G | R | PG-13 | R | R | PG | G | PG-13 | PG |
| Elements | N/A | N/A | TE, S | N/A | L, CS | SF A/V | SR | L,SR | TE | N/A | IV | TE |
| # Days | 3 | 15 | 6 | 22 | 28 | 10 | 45 | 17 | 5 | 14 | 24 | 19 |
| # Venues | 8800 | 7325 | 4178 | 5623 | 9012 | 9836 | 8345 | 6453 | 7614 | 4533 | 5978 | 8979 |
| Child:Adult | 3:1 | 2.8:1 | 1.8:1 | 2.45:1 | 0.1:1 | 2.2:1 | 0.2:1 | 0.1:1 | 3.2:1 | 2.8:1 | 2.7:1 | |
| Incentive | $P_2$ | $P_3$ | $P_1$ | $P_2$ | $P_1$ | $P_1$ | $P_2$ | $P_1$ | $P_1$ | $P_2$ | $P_1$ | $P_3$ |

FIG 5

| GAME # | MOVIE TO GAME MAPPING | | | | | | | | | | | |
|---|---|---|---|---|---|---|---|---|---|---|---|---|
| | $M_1$ | $M_2$ | $M_3$ | $M_4$ | $M_5$ | $M_6$ | $M_7$ | $M_8$ | $M_9$ | $M_{10}$ | $M_{11}$ | $M_{12}$ |
| G1 | Y | Y | Y | Y | Y | Y | Y | Y | Y | Y | Y | Y |
| G2 | Y | Y | Y | Y | Y | Y | Y | Y | Y | Y | Y | Y |
| G3 | N | N | N | N | Y | N | Y | Y | N | N | N | N |
| G4 | N | N | N | N | Y | N | Y | Y | N | N | N | N |
| G5 | N | N | Y | N | Y | Y | Y | Y | Y | N | Y | Y |
| G6 | Y | Y | Y | Y | Y | Y | Y | Y | Y | Y | Y | Y |

FIG 7A

| PRE-SHOW SCHEDULE - THEATER $T_m$ | | | | | |
|---|---|---|---|---|---|
| | SCHEDULED GAMES | | | | |
| START TIME | $M_1$ | $M_2$ | $M_{10}$ | $M_4$ | $M_{10}$ |
| 13:00 | G1+G2+G6 | G1+G2+G6 | G1+G6 | G1+G2 | G2+G6 |
| 14:40 | G10+G11 | G10 | G3+G5 | G1+G3+G7 | G2+G3 |
| 15:45 | G1+G3+G7 | G2+G5 | G3+G5 | G1+G3+G7 | G2+G3 |
| 17:00 | G1+G3+G7 | G2+G5 | G3+G5 | G1+G3+G7 | G2+G3 |
| 18:30 | G1+G3+G7 | G2+G5 | G3+G5 | G1+G3+G7 | G2+G3 |
| 20:00 | G1+G3+G7 | G2+G5 | G3+G5 | G1+G3+G7 | G2+G3 |
| 21:20 | G1+G3+G7 | G2+G5 | G3+G5 | G1+G3+G7 | G2+G3 |

FIG 7B

SYSTEM AND METHOD FOR ARRANGING AND PRESENTING INTERACTIVE MULTIPLAYER GAME SESSIONS TO AN AUDIENCE

CROSS-REFERENCE TO RELATED APPLICATIONS

This application claims benefit of U.S. Provisional Patent Application Ser. No. 62/009,609, filed Jun. 9, 2014; and U.S. Provisional Patent Application Ser. No. 62/009,614, filed Jun. 9, 2014, both of which are herein incorporated by reference.

BACKGROUND

1. Field

Embodiments of the present invention generally relate to systems and method for providing an interactive experience to audiences in a multiple viewer presentation environment such as a movie theater or cinema.

2. Description of the Related Art

Prior to the beginning of a feature presentation (i.e., the movie that members of a theater audience have come to watch), a "pre-show" is commonly provided. A pre-show includes advertising and other display content in the form of slides (also called "fixed stock") that are presented in seriatim to the theater screen by projector technology. The fixed stock is presented when the theater lighting is dimly lit and moviegoers are entering the theater to take their seats during the seating period. Another form of advertising, called "rolling stock", is presented when the lights have been lowered and most of the moviegoers are seated during the pre-feature period. Rolling stock may include such advertising content as trailers for other movies currently featured in the same theater, as well as trailers for upcoming movies from the same studio.

For a variety of reasons, fixed stock has a smaller and less attentive audience than rolling stock. One reason may be the static and repetitive nature of the content. However, the inventors herein have also observed the tendency of members of the audience to find other ways to entertain themselves during the seating period. Mobile terminals such as smart phones and tablets, for example, have become both ubiquitous and capable of supporting a host of interactive, feature-rich applications. Only at the time when presentation of the rolling stock begins, as a transition to the feature presentation, are the lights of the theater lowered and patrons asked to turn off their mobile terminals to avoid disturbing other patrons.

As such, the inventors have further determined that a continuing need exists for systems and methods which better utilize the seating period as a means to gain meaningful and statistically significant consumer insights from and market products and services to members of a movie theater audience.

The inventors herein have further determined that a continuing need exists for systems and methods able to achieve the foregoing ends inside and outside of the group viewing context.

SUMMARY

The Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computer implemented method of presenting pre-show content to movie theater audiences includes receiving requests from an exhibitor. According to some embodiments, the request identifies at least one of the title of a feature presentation, the genre and/or content rating of the feature presentation, the feature presentation start time, and the amount of time budgeted for the pre-show session or "event" which will precede the feature presentation. At least one multiplayer game for each pre-show session is identified from a plurality of multiplayer games available from a game server. According to embodiments, a subset of available multiplayer games is selected automatically based on information included in the request(s) received from one or more exhibitors. The selected games should at least be consistent with the audience maturity rating of the feature presentation, a genre of the feature presentation, and/or the socio-demographic composition of the audience (i.e. age, gender, etc.). That is, the selected games either match any and/or all of the foregoing or they are of such an inoffensive nature that they are compatible with (i.e., appropriate for) all audiences.

Other selection criteria may be utilized in identifying the multiplayer games, as for example, when intra or inter-theater competition is contemplated and the identified games must be appropriate for more than one audience, each of which may have differing socio-demographic characteristics or tastes in entertainment content (as demonstrated by which feature they have come to a theater to see. According to other embodiments, the need to pair game(s) with audience characteristics is avoided entirely by limiting the pool of games to those which contain no offensive language, violence, or other content which might offend someone in an audience. Once a pool of games has been identified, the selection can be automatic (i.e., random or in a round-robin fashion), based on whether a game distributor is offering a promotion for "showcasing" the game or, according to some embodiments, a list of selected game "candidates" is presented to one or more audiences for voting. Where a game to be played by players distributed among different audiences is scheduled for the same time slot, a single instantiation of the game is presented to the multiple audiences.

According to some embodiments, user account records are retained for both the exhibitors, who access and schedule requests via a central server, and for the members of the audience desiring to actively compete in a multiplayer game, or to participate in the game in some other way. In the latter case, embodiments of the invention contemplate the installation of an application on the mobile communication terminals (e.g., smart phones) of these members. The application facilitates use of the mobile communication terminal to participate in the games and to consummate e-commerce transactions mediated by or on behalf of the exhibitor. In the latter regard, a user of a mobile terminal on which the application has been installed is presented, according to some embodiments, with the ability to make purchases of concessions while seated in the theater and either pick up these items in a "will call" area or have them brought directly to the user's seat. Consummation of such e-commerce transactions enables the user to accumulate incentive award "points" which are redeemed, for example, when the user requests and is granted access to participate in a multiplayer game. By way of further e-commerce transaction example, a user who has just seen a movie is presented with an offer to purchase and download, to his or her mobile communication terminal, a song from the sound track of the featured content or even a game that he or she viewed or played as part of the pre-show accompanying the feature content. As yet a further example, a user may accumulate incentive points by agreed to participate in a survey relating any of the foregoing.

In another embodiment, an apparatus for providing forms of interactive entertainment to a group in visible proximity to a group display screen includes a base station having a transceiver for receiving user input from a first plurality of mobile terminals each having a processor, a memory containing instructions executable by the processor, and a transceiver. A game server is communicatively coupled to the base station, and a processor of the game server is configured to execute instructions for processing user input received from at least one of the first plurality of mobile terminals to enable a first mobile terminal user to actively compete against at least a second mobile terminal user while looking at the display screen of a respective mobile terminal. The processor is further configured to execute instructions, stored in memory, for generating display content corresponding to an interactive, multiplayer game. The generated display content is provided to a rendering engine or a projector which, in turn, renders or projects, as the case may be, the generated display content to the group display screen. Additionally, the processor is operative to execute instructions stored in memory for providing first generated display content to the first and second mobile terminal so as to enable their use by audience members wishing to participate in the multiplayer game.

Other and further embodiments of the present invention are described below.

BRIEF DESCRIPTION OF THE DRAWINGS

FIG. 5 is a tabular representation of feature titles and start times, for associated exhibitors and theaters, as constructed and referenced by one or more embodiments;

FIG. 6 is a tabular representation linking feature titles to data useful in carrying out one or more embodiments;

FIG. 7A is a tabular representation mapping feature titles to games based on filtering criteria such as those depicted in the exemplary representation of FIG. 6B, according to one or more embodiments;

FIG. 7B is a tabular representation of an illustrative game schedule for an exemplary movie theater, by feature title/audience, according to one or more embodiments;

Figure 1A:
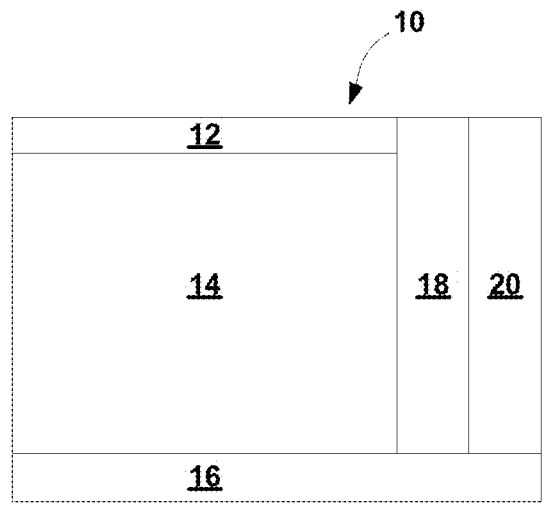
FIG. 1A depicts a graphical representation of an illustrative pre-show image, taken at a specific instance of time prior to screening of featured display content (i.e., a feature presentation such as a movie), according to one or more embodiments.

While the method and apparatus is described herein by way of example for several embodiments and illustrative drawings, those skilled in the art will recognize that the method and apparatus for ordering images in an image set based on social interactions and viewer preferences is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for ordering images in an image set based on social interactions and viewer preferences defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The following description and drawings are illustrative and are not to be construed as limiting. Numerous specific details are described to provide a thorough understanding of the disclosure. However, in certain instances, well-known or conventional details are not described in order to avoid obscuring the description. References to "one embodiment" or "an embodiment" in the present disclosure can be, but not necessarily are, references to the same embodiment and such references mean at least one of the embodiments.

Reference in this specification to "one embodiment" or "an embodiment" means that a particular feature, structure, or characteristic described in connection with the embodiment is included in at least one embodiment of the disclosure. the appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

According to embodiments of the present invention, techniques and systems are provided for the purpose of conveying interactive display content to movie-going audiences. A software client downloaded to and installed on the mobile terminal (e.g., Smartphone) of an audience member enables that audience member to interact "in-theater" with the system. Such interaction takes the form of participation in a multi-player game, exchanging messages on a social media network, providing responses to queries, and/or ordering games and other media content during the course of a pre-show.

Figure 1B:
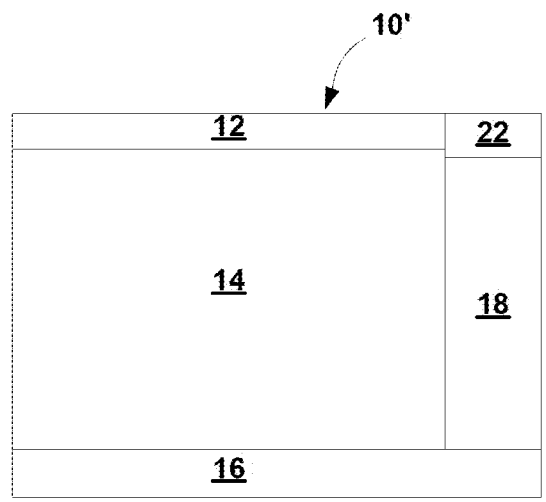
FIG. 1B depicts a graphical representation of a pre-show image taken at a point in time subsequent to the point at which the image of FIGS. 1A and 1B were taken.

In some embodiments, the display content conveyed to an audience includes an instantiation of an interactive multi-player game, multiple instantiations of interactive multi-player games in seriatim, or either of these combined with messages exchanged as part of a social network. Embodiments of the invention are intended to integrate with any in-theater infrastructure configured to organize and present advertising and non-advertising content, received from various sources, to members of an audience. In this regard, a plurality of sets or types of content may be presented to the audience concurrently at different points of a pre-show. According to some embodiments, as exemplified by FIGS. 1A and 1B, a plurality of discrete "panels' of content are provided, in a single composite image on screen 10. FIG. 1A corresponds to a "staging" phase of a pre-show event. Each panel has own frame and is indicated by reference numerals 12, 14, 16, 18 and 20, respectively. FIG. 1B presents an exemplary composite screen 10' applicable to the pre-show gaming session which follows the staging phase. In this example, panel 20 is omitted, more area is dedicated to panel 14, and newly added panel 22 presents information not previously provided during the staging phase.

The interactive pre-show image exemplified by the embodiment of FIG. 1A utilizes Hypertext Markup Language (HTML) according to the HTML5 format. Each frame contains an HTML page with visual contents. The overall presentation length of the example is designed to run for a specified period of time, e.g., 20 minutes. According to some embodiments, one or more frames are persistent during a pre-show and the content of the corresponding pages are updated by scrolling or through contents replacement. Other frames are needed or desirable during particular portions of a pre-show but can be omitted at all other times. A pre-show generated and presented to an audience according to embodiments of the invention can therefore optionally comprise a sequence of images displayed on screen 10, each having a different number and/or arrangement of frames.

With continuing reference to the illustrative example of FIG. 1A, the upper left frame 12 contains a page with a single GIF image that identifies a "Quiz" question which according to some embodiments relates in some way to the content being displayed concurrently in the page of one of the other frames. In the instant example, the question asks if one of the members of the audience can identify the song being played in a video or movie trailer being rendered as HTML5 content as the page of frame 14. The bottom frame 16 contains a page which presents a set of GIF images, all of which are static in the instance example but any of which may be animated instead. The images correspond to instructions for downloading, installing and activating a client application for the purpose of interacting with an interactive pre-show engine according to embodiments of the invention.

A first of the GIF images in frame 16 identifies the service set identifier (SSID) of a wireless access point. If a member of the audience has a mobile terminal (e.g., a smart phone with a touch screen interface) and has not yet done do, he or she connects to the internet via the access point to download and install a client application. Once installed and activated on the audience member's mobile terminal, this application executes a number of functions which enhance the movie-going experience. A social media message may be entered by an audience member using the user interface of his or her mobile terminal, and these messages are shared with members of the same audience, as well as other audiences of the same theater or even of other theaters, as they await the beginning of a feature presentation. According to embodiments, the messages are screened for content appropriate to the theater audience and are incorporated into a preshow display on screen 10 (e.g., by scrolling of the page within a frame such as frame 18).

According to some embodiments, only relevant social media messages are incorporated into images being projected to a screen in another room of the same theater, or to into images being projected to one or more screens of other theater (s). In some embodiments a message is considered relevant, for example, if it relates in some way to a game being played, a genre of game being played, the feature presentation, a genre of movie being presented, or to a promotion of a product or service being offered to the audience as a whole or targeted at socio-demographic groups represented by the audience. According to embodiments, a user selects any of the aforementioned panels as 12, 14, 16, 18 and 20 to be displayed on the display of his or her own mobile terminal executing the aforementioned application. For example, a user selecting panel 18 scrolls down to view messages posted to the same social network "wall" as projected to the theater screen. A mobile terminal touch event over any link or button rendered to the display of the mobile terminal corresponding, or comparable user input event, invokes display of a message posted to the social network "wall" displayed in panel 18. This, in turn, brings the user to a page which enables the user to access information of interest and/or enables the user to reply to a selected message.

In addition to posting messages as between members of a social network, a user of a mobile terminal executing the client application can answer the question presented in frame 12 of FIG. 1A. A message identifying the correct answer and first person to answer correctly is automatically generated and rendered to social networking "wall" frame 18. According to some embodiments, a prize such as a discount coupon for concessions or "points" redeemable for services and products accessible via the client application (including gaming session privileges) are awarded for a correct answer and for other activities invoked via the mobile terminal. It is contemplated by the inventors herein that engaging the audience in such an interactive and competitive fashion will encourage patrons to arrive early, promote greater purchases of concessions and other high-margin items, and maximize opportunities to gain valuable marketing insights about the patrons.

In the latter regard, according to one or more embodiments, a user who has played or viewed a game as part of a pre-show, or who has just seen the movie or other featured content presented thereafter, is invited to answer survey questions. Preferably, the invitation is extended and the responses are collected while the movie is still "top of mind" for members of the audience. In an embodiment, a time or time window for sending invitations to participate in a survey is scheduled based on a countdown from a pre-defined end time of a feature presentation (e.g., a movie). As an example, the time or time window can be 0 to 120 minutes from the conclusion of the feature presentation. According to embodiments, a bonus incentive is awarded for responses submitted within a predetermined window of, for example, 5 to 15 minutes. The invitation can be sent by e-mail, an SMS (Short Message Service) text message, by e-mail, or even as a post to the "wall" frame of a social networking application displayed as a menu option of the client application downloaded to the user's mobile terminal. Survey responses are collected and, optionally, anonymized by assignment of a unique identifier from which the identity of a user cannot be derived. The anonymized or non-anonymized responses, as applicable, are stored in a market research database connection with various socio-dynamic data associated with the user.

Within continuing reference to the example of FIGS. 1A and 1B, a user uses his or her mobile terminal to join and participate in a multiplayer game rendered to the html5 page of frame 14 during a subsequent phase of a scheduled preshow. During the preceding "staging" phase, the social media avatars of audience members who have already been accepted as active competitors in a game are displayed in frame 20. By reviewing images on the theater screen 10 and/or checking a menu rendered to the display of his or her mobile device, a mobile terminal user who has not yet reserved a place in game being staged can determine what, if any roles are still available and provide necessary authenticating information as a condition to doing so. The page rendered to frame 20 of the image on screen 10 also includes a countdown timer which counts down to the start time of the multiplayer game being staged. Optionally, a countdown timer showing time remaining before the beginning of a feature movie presentation is rendered to the page of frame 22 in the image on screen 10' (each, FIG. 1B). Moreover, either of these timers can be rendered to the display screen of a mobile terminal executing the client application—responsive to menu item selection via the client application user interface.

It suffices to say that the various frames comprising a pre-show session according to embodiments of the invention is not limited to the particular examples discussed above. Moreover, the html format, http protocol, and associated browsers and servers work together to bring a presentation to an audience in the exemplary embodiments. However, there are other languages, transfer protocols and rendering software that could be combined to create the same or similar result. Other suitable examples include the successor to HTML, Extensible Markup Language (XML), using Extensible Link Language (ELL), emerging and related specifications. Other alternate means serving the same purpose could also be derived from Standard Generalized Markup Language (SGML).

Other languages could also be constructed to serve the same purpose of storing, conveying and rendering text, images, and game video and/or graphics. These languages would likely be, but aren't required to be, specified through a Document Type Definition (DTD). These languages could render the content natively or they could host binary objects that render tagged sub-contents. This would eliminate the need for HTML, XML or any other SGML-based language and serve the same purpose of embodiments of the present invention.

Likewise, the contents need not be encapsulated in a language or script. They could be managed through a list of contents with or without associated attributes and operating parameters. Such a list could be read by specialized display software and rendered according to the attributes and operating parameters. This would eliminate the need for a language and serve the same purpose of embodiments of the present invention. According to other embodiments, attributes and operating parameters are embodied within the display objects themselves. In this way, a set of display objects is taken as a stream and rendered by specialized display software according to their respective internal attributes and operating parameters. This obviates the need for a contents list.

Figure 2A:
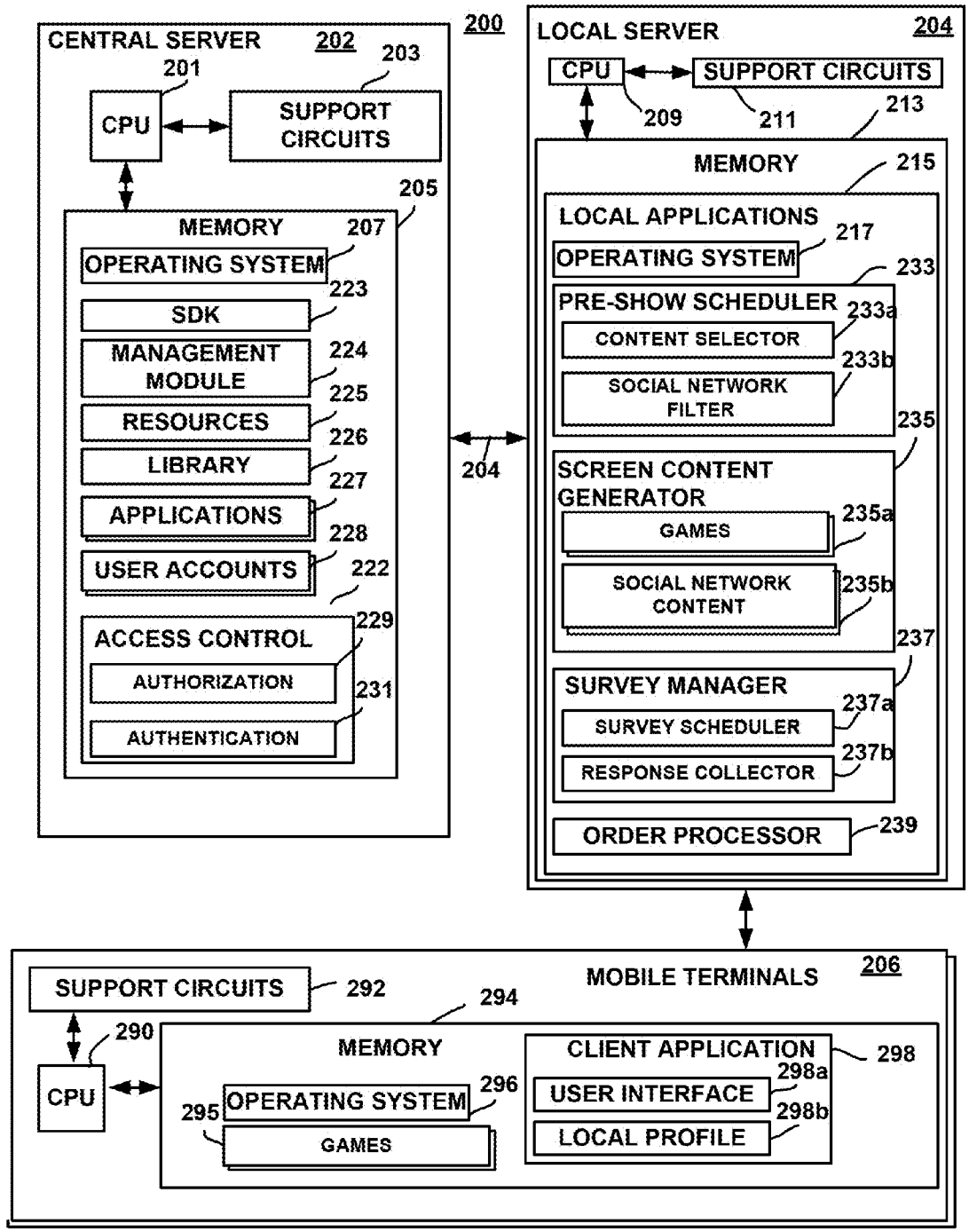
FIG. 2A depicts a functional block diagram illustrating a system for arranging and presenting interactive pre-show sessions to an audience according to some embodiments.

Whether by language, a contents list, or a stream of objects, some of the content rendered to projected image on screen 10 of FIG. 1A and screen 10' of FIG. 1C is either pushed or pulled from a server. FIG. 2A depicts a functional block diagram illustrating a system 200, constructed in accordance with some embodiments, for arranging and presenting interactive pre-show sessions to an audience wherein at least some members of the audience possess a mobile terminal configured to execute an enabling client application. System 200 includes a central server 202 and a local server 204, each of which may be implemented as a distributed plurality of servers configured to exchange data over a local or wide area network. Servers 202 and 204, in turn, have respective network interfaces to support communicative coupling therebetween. A communication link 208 established between the interfaces of central server 202 and local server 204 facilitates the exchange of data and instructions according to one or embodiments. According to some embodiments, local server 204 is configured with a wireless network interface and one or more wireless access points for establishing respective wireless links to the plurality of mobile terminals 206.

According to some embodiments, server 202 is a computing device, for example a desktop computer, laptop, tablet computer, and the like. The server 202 includes a Central Processing Unit (CPU) 201, support circuits 203, and a memory 205. The CPU 201 may include one or more commercially available microprocessors or microcontrollers that facilitate data processing and storage. The various support circuits 203 facilitate the operation of the CPU 201 and include one or more clock circuits, power supplies, cache, input/output circuits, network interfaces, and the like. The memory 205 includes at least one of Read Only Memory (ROM), Random Access Memory (RAM), disk drive storage, optical storage, removable storage and/or the like.

The memory 205 includes an operating system 207, an access control manager module 222, a software development kit (SDK) 223, resources 225 including a game library to be accessed by local server 204 via communication link 208, a library 226 of tools for game developers, a management module 224, a plurality of applications 227, and a plurality of user accounts 228. The operating system 207 may include various commercially known operating systems.

According to embodiments, access control manager 222 receives user credentials from administrators, game developers, survey creators, survey report clients, exhibitors, and other individuals seeking access to one or more of applications 227 implemented by execution of instructions by CPU 201. Access control manager 222 includes an authorization module 229 and an authentication module 231. In some embodiments, authorization module 229 verifies that user is entitled to gain access to one of the applications 227 by checking the user name or e-mail address against a list of authorized user names, while authentication module 231 verifies the identity of the user by checking a password, device token, or access token submitted by the user along with the user name as part of the user credentials received by authorization module 229.

According to some embodiments, server 202 hosts a game development program which includes SDK 223, management module 224, resources 225, and library 226. Once authenticated and authorized by user access control manager 222, a game developer is provided with a suite of tools including a code base, APIs, and in some embodiments, a set of commands for use when the game instantiation resides solely in a local server as server 204. In embodiments of the latter variety, a "pre-show demo" instantiation of the game hosted by the server is not also executed simultaneously at mobile terminal device 206 such that the user of the mobile terminal views the game on the device display. Instead, the mobile terminal device 206 is used solely for entering user input via a touch screen or re-mapped buttons and keys, and for providing haptic feedback to the user holding the device. In an embodiment, the user input and haptic feedback is exchanged between server 204 and mobile devices 206 via a wireless local area network associated with an exhibitor location. By appropriate reference to APIs available through library 226, a developer creates games which process commands returned by mobile terminals 206 and which transmit haptic feedback generation commands to those terminals as part of the game experience.

In other embodiments, the game hosting environment delivered by server 204 is preconfigured for interoperability with common mobile terminal operating systems as, for example, supported versions of Google Android and Apple iOS. In such cases, the need for a software development kit may be obviated and the game developer merely focuses on developing a game, or modifying an existing game, which complies with an appropriate set of rules.

According to some embodiments, server 204 is a computing device associated with an exhibitor location, for example a desktop computer, laptop, tablet computer, and the like within a movie theater facility. The server 204 includes a Central Processing Unit (CPU) 209, support circuits 211, and a memory 213. The CPU 209 may include one or more commercially available microprocessors or microcontrollers that facilitate data processing and storage. The various support circuits 211 facilitate the operation of the CPU 209 and include one or more clock circuits, power supplies, cache, input/output circuits, network interfaces, and the like. The memory 213 includes at least one of Read Only Memory (ROM), Random Access Memory (RAM), disk drive storage, optical storage, removable storage and/or the like. The memory 213 includes an operating system 215, and a plurality of local applications 217. The operating system 217 includes various commercially known operating systems.

According to some embodiments, mobile terminal devices 206, alternatively referred to herein as mobile terminals and mobile devices, are mobile computing device characterized by a CPU 290, support circuits 292, and memory 294. Typical mobile computer devices include smartphones, tablet computers, and wearable computers. The CPU 290 may include one or more commercially available microprocessors or microcontrollers that facilitate data processing and storage. The various support circuits 292 also facilitate the operation of the CPU 290 and include one or more clock circuits, power supplies, cache, input/output circuits, network interfaces, and the like. Support circuits 292 also include user interface components such as a display, touchscreen, rocker switches and buttons, and a haptic feedback generator commonly used for silent modes of phone operation. Support circuits 292 also include a camera and an accelerometer. The memory 213 includes at least one of Read Only Memory (ROM), Random Access Memory (RAM), disk drive storage, optical storage, removable storage and/or the like. The memory 294 includes an operating system 295, one or more locally installed games 295, and a client application 298 executable by CPU 290 to schedule game participation, participate in preshow games, create and review social network messages, respond to surveys, and enter into e-commerce transactions such as concession purchases and soundtrack downloads. The operating system 296 includes various commercially known operating systems.

The applications 217 and 227 include a pre-show scheduler application 233. In some embodiments, the pre-show scheduler 233 is downloaded to server 204 from server 202 and then launched locally by a feature presentation exhibitor (e.g. a movie theater operator). In some embodiments, a client server model is employed, wherein a server version of the scheduler application program resides at, and is executed by CPU 201 of, server 202 and wherein a client version resides at, and is executed by CPU 209 of, server 204. Using the local or client version of the preshow scheduler, the exhibitor enters a start time of each pre-show and each feature presentation, identifies the feature presentation by title, and enters any custom filter settings to be used in arranging and presenting interactive preshow sessions according to illustrative embodiments herein described. In some embodiments, a content selector 233a of scheduler 233 accesses the scheduling data, projected socio-demographic data and other data available about the feature presentation, as well as filter settings 233b, and determines the number and identity of games to be presented as part of an interactive preshow. In embodiments where a plurality of social network message streams (i.e., "channels") have been derived by applying different filter criteria to include and exclude messages based on their relevancy and appropriateness for a given audience, the content selector 233a is further operative to select one of these streams.

The applications 217 and 227 also include a group display screen content generator 235. In embodiments, when the scheduled time for a preshow session arrives, scheduling program 233 is configured to notify group display screen content generator 235 to begin projecting a staging version of the preshow display on screen 10 (FIGS. 1A and 1B) panel. Scheduler 233 is further configured to authenticate and authorize players requesting to join the game, and to update the list of game participants and their respective roles. When a game is ready to launch, the scheduler 233 is configured to transmit instructions causing server 204 to launch an instantiation of the game, to notify the participants via their respective mobile terminal devices 206, and to instruct the group display content generator 235 to begin projecting the active game version on screen 10' of the interactive preshow display (FIG. 1C).

In embodiments, group display content generator 235 is downloaded from server 202 to server 204. Group display content generator includes a portion of server 204 responsible for hosting a local game instantiation, indicated generally at reference numeral 235a, and a portion of server 204 responsive for receiving and filtering social network messages, indicated generally at 235b. In an embodiment, group display content generator 235 renders the game instantiation 235a and social network messages 235b, along with any locally provided content, to respective visible panels by projection to a group display screen.

Applications 217 and 227 also include a survey manager program 237 and an e-commerce order processing program 239. According to embodiments, interested parties, including exhibitors, advertisers, feature presentation content owners (or distributors), and game developers, are permitted to construct and submit survey questions for inclusion in one or more surveys to be presented to owners of mobile devices who have attended a preshow and feature presentation. Survey manager 237 includes a survey scheduler 237a, and a response collector 237b. In some embodiments, the survey manager is downloaded to server 204 from server 202, and surveys are constructed, scheduled and launched locally by a feature presentation exhibitor (e.g. a movie theater operator). In other embodiments, a client server model is employed, wherein versions of the survey manager application reside and are executed at both central server 202 and server 204. A server implementation of the survey application constructs surveys of broader geographic reach and higher statistical power, collecting questions from a variety of interested parties as noted above.

In embodiments, the survey scheduler module 237a causes survey questions, regardless of origin, to be sent to users of mobile terminal devices 206 during a pre-show or immediately after a feature presentation while recollections are still fresh. Responses are collected by collector 237b and, if applicable, incentive award points are awarded by a user account module (not shown) of order processing application 239. In some embodiments, survey scheduler 237 is operative to select an audience for participation in a survey on the basis of the title of a feature presentation, a game played during a preshow, a time of day, or a geographic location. In some embodiments, individual members of an audience are selected for participation based, in addition to any or all of the aforementioned audience selected criteria, on a user profile developed via the user's prior interactions with system 200.

As noted earlier, the applications 217 and 227 also include an e-commerce order processor 239. Order processor 239 is invoked when the user of a mobile terminal 206 executes an order entry client application 298. A user of a mobile device executing client application 298 operates an e-commerce version of user interface 298a. According to some embodiments, one or more user profiles are maintained in device 206. For example, a game version of user interface 298b has a corresponding user profile which may specify certain user setting such as high score, and games. A social network version of user interface 298b includes user names comprising a buddy list or buddy group for the user. In similar fashion, an order processor version of user interface 298a includes a local profile which may streamline some or all of the order execution process. Order processor 239 also maintains a user profile in order to track each mobile terminal user's purchase history, accumulated incentive award points, and point redemption history.

Figure 2B:
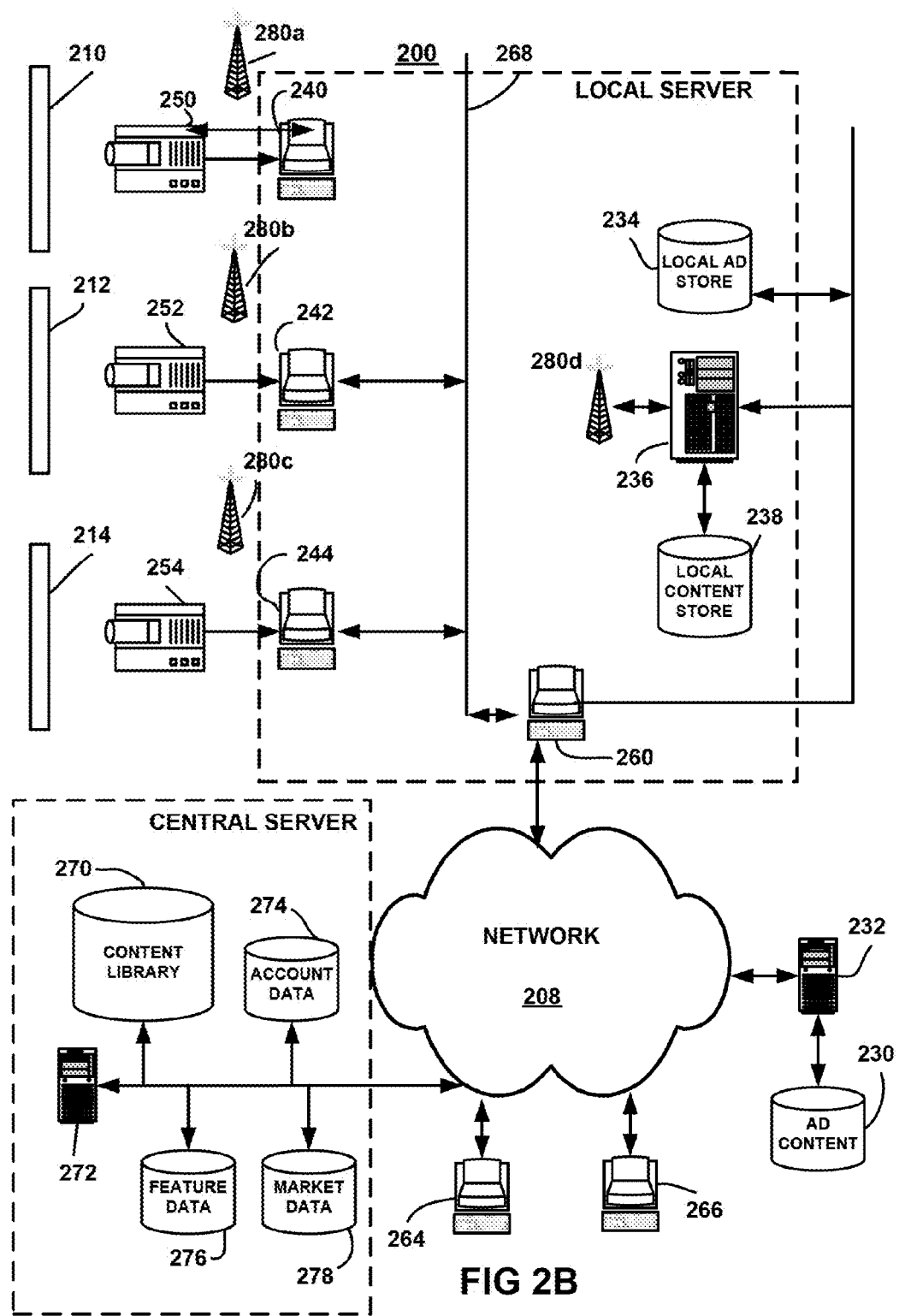
FIG. 2B depicts an illustrative view of the physical architecture of a system for arranging and presenting interactive multiplayer game sessions to one or more audiences of a single theater according to one or more embodiments.

An illustrative arrangement employing system 200 for integrating and delivering advertising, multiplayer game sessions, social media messaging, and other pre-show content to multiple screens, as screens 210, 212 and 214 of a theater 220, is shown in FIG. 2B. In FIG. 2B, there is shown an embodiment of a system 200 configured to enable members of one audience—e.g., those viewing a first group display screen 210 located within a first building (such as the building associated with theater 220)—to interact, as by playing multiplayer games and/or exchanging messages via a social network, with members of one or more additional audiences within the same building. In the exemplary embodiment of FIG. 2, a second audience is viewing second group display screen 212 while a third audience is viewing third group display screen 214 and both of these are within the same theater 220. The overall system 200 may be described physically as an interconnected set of general purpose computers, software, and electronics. These components include central content library 270, central content server 272, account database 274, feature content information database 276, and market information database 278. Each of the aforementioned components is connected to local administrative server 260 at building 220 via a communication network such as the internet 262. The local administrative server 260 is also communicatively coupled to a set of client assemblies via intranet 268.

Each client assembly includes a client assembly server, as servers 240, 242 and 244 within building 220. Each client assembly further includes a projector as projectors 250, 252 and 254. This grouping of interconnected equipment facilitates centralized management of interactive content but also distributed presentation of interactive content. In some embodiments, servers as servers 240, 242 and 244 are tasked with receiving, storing, and assembling interactive content for presentation via group display screens 210, 212, and 214 respectively. In the embodiment of FIG. 2A, however, these functions are performed by local administrative server 260, while servers 240, 242 and 24 are reserved for the purpose of rendering interactive content for projection to the group display screens by projectors 250, 252 and 254. According to alternate embodiments, projectors are omitted and the group display screens themselves are active components responsive to input from servers 240, 242 and 244.

According to embodiments, each of servers 240, 242 and 244 includes a personal computer (PC) that is connected to the system's intranet 268 via a connection port through which it receives gaming and other interactive content and, optionally, separate advertising content. Associated with each server is a digital projector through which the PC renders the frames comprising each stage of a pre-show event onto the group display screen. As the local recipient and staging platform of the gaming and other interactive content being presented according to embodiments, each server as server 240 receives the presentation via the intranet connection and stages it for access by a local server process. When the presentation is started by a screen operator, it is rendered to the corresponding digital projector as projector 250 and projected to an associated group display screen as screen 210 for the audience to view. One assembly is required for each screen location for the projection of messages from embodiments of the present invention.

In an embodiment, each projector as projector 250 is a high-intensity output device that projects a digital image onto a reflective surface to be viewed by a large audience. Suitable projectors for the purpose of projecting a digital image onto a commercial movie screen include but are not limited to projectors manufactured by Barco Display Systems of Kortrijk, Belgium, Digital Projection International, PLC of Manchester, England, and NEC of Tokyo, Japan.]

In the embodiment of FIG. 2A, selections of advertising content are pulled from a central ad content database 230 via ad server 232. The advertising content is stored at a local, ad content store 234 for administration by local administrative server 260. The locally stored ads, in turn, are distributed to the aforementioned client assembly servers. According to embodiments, and with continued reference to the embodiment of FIG. 2A, multiplayer games are likewise pulled from a central location. Specifically, the games are retrieved from central content library 270 via central administration server 272 and stored at local game content store 238 for administration by local interactive entertainment server 236.

A game instantiation to be rendered to the one or more theater screens, for presentation as part of image screen 10' (FIG. 1B) to the corresponding audience(s) situated proximate to such screen(s), resides in local entertainment server 236. According to an embodiment, scheduling of one or more pre-show events which combine locally stored and served game and ad content, respectively, is implemented at local administrative server 260 which is operative to exchange information over communication network 262 with central administration server 272. For like operation of other systems 200 by other exhibitors, a corresponding local administration server, as server 264, is provided at each exhibitor location.

It should be noted that separating ad content and game content administration, utilizing a discrete server for gaming and other interactive content in the manner exemplified by FIG. 2B, gives the exhibiting theater operator greater control over the integration of local advertising content. Also, it permits the use and integration of interactive entertainment systems according to some embodiments to be installed alongside pre-existing ad content rendering infrastructure. For example, a theater owner may desire to allocate only a portion of a pre-show event to the delivery of multiple player games, prior to screening of a feature presentation, according to some embodiments but reserve a remaining portion of a pre-show event to the delivery of conventional ad content. It should also be emphasized that the administration of and delivery of advertising and interactive entertainment content, using a single server, is also within the spirit and scope of the present disclosure.

According to further embodiments, at least some (or all) ad content is delivered "on demand" to the mobile terminal devices of certain users, rather than rendered or projected to the group display screen(s) during a pre-show event. A user viewing a social networking page of display screen 10' (FIGS. 1A and 1B) need only invoke a client application on his or her mobile terminal (which he or she may already have done in order to post messages to such page) in order to click on advertisement placed on the page. In such cases, the need for a local advertisement planning and rendering capability, as exemplified by FIG. 2B, may be omitted altogether. Alternatively, it may be used to push special offers such as coupons to the mobile terminals as part of the aforementioned social networking functionality.

In any event, and with continued reference to FIG. 2B, it will be seen that content library 270, user account database 274, feature presentation information database 276, and market information database 278 are each operatively associated with and communicatively coupled to central administration server 272. Data stored within user account database 274 is used to authenticate exhibitors such, for example, as a first exhibitor (e.g., operator of a first movie theater using local administrative server 260) and a second exhibitor (e.g., operator of a second movie theater using local administration server 264). Authentication proceeds in a conventional manner using, for example, a respective unique user identifier and password combination assigned to each corresponding exhibitor (or member of the exhibitor's staff).

Feature database 276 includes, inter alia, information such as movie titles, typical audience profiles for such movie titles, movie ratings, and genre classifications. As will be discussed in greater detail shortly, such feature data is used in some embodiments to select multi-player games which are appropriate for the members of a particular audience, and to filter out content inappropriate for an audience so that it is not included among the posts to a social network page projected to the group display screen, as one of screens 210, 212 or 214, associated with that audience. Over time, data is gathered from the mobile terminal users about their viewing and pre-show spending patterns, the products they purchase, socio-demographic data, and the like, and this data is collected and stored in market data database 278.

According to some embodiments, the account data within database 274 further includes data for authenticating the creators of video content or advertising content of which at least the former content uploaded by authenticated users is stored in content library 270. According to some embodiments, advertising content of the type to be rendered to individual users is also be uploaded to content library 270 as, for example, special discount offers and promotions to be acted upon by audience members equipped with a mobile terminal and interacting with system 200 as already described. Finally, in some embodiments database 274 further includes data for authenticating the users of mobile terminals who utilize an application, executed by a processor thereof, to consummate e-commerce transactions with the exhibitor, to participate in a multi-player game, or to interact with the social networking functionality of system 200. Such authentication enables the accumulation of data regarding user purchases of such items as concessions, sound tracks, and other items which may be of interest to advertisers and others. According to some embodiments, such purchase transactions are stored database 278 in association with a unique, anonymized user identifier as opposed to personally identifiable information such as user name, address, phone number or the like.

According to some embodiments, market database 278 further includes the results of surveys administered to some or all members of an audience during a pre-show event or after a feature presentation. By way of illustrative example, those mobile terminal users who participated in and/or observed an instantiation of a multi-player game during a pre-show event may be asked to answer questions about the game itself. Some or all of these questions can be submitted by the entity or entities that created and made available the game. A content contributor using a workstation as workstation 266 to access a reporting portal administered over the communication network, e.g., via central administration server 272 or an associated web server (not shown) views the results of such survey. By way of alternate example, a survey may be pushed to audience members still invoking the mobile terminal application after the feature presentation in order to collect respondents' impressions. The impressions can be about advertisements the users saw in the social network panel presented during the pre-show, an advertisement they saw at some other point during the pre-show event, about a particular concession item they purchased, or even about the feature presentation itself. Owing to central collection capabilities, the impressions of many audience members can be aggregated to reach about of statistical significance and offered to interested entities on a syndicated reporting basis.

To accommodate the exchange of information between the mobile terminals of users and local interactive entertainment server 236, some form of network connectivity is required. Where, as in the example of FIG. 2B, multiplayer games are played on a strictly local (intra building) basis, the relatively high cost and/or signal strength variability issues associated with use of a mobile carrier network can be avoided. To this end, each location as theater 220 utilizes a wireless local area network for the exchange of signaling between local interactive entertainment server 236 and the user mobile terminals. Wireless access points as access points 280a to 280d are distributed throughout building 220. In this regard, any suitable wireless communication protocol may be used such, for example, as a Bluetooth, IEEE 802.11, and the like.

Figure 3:
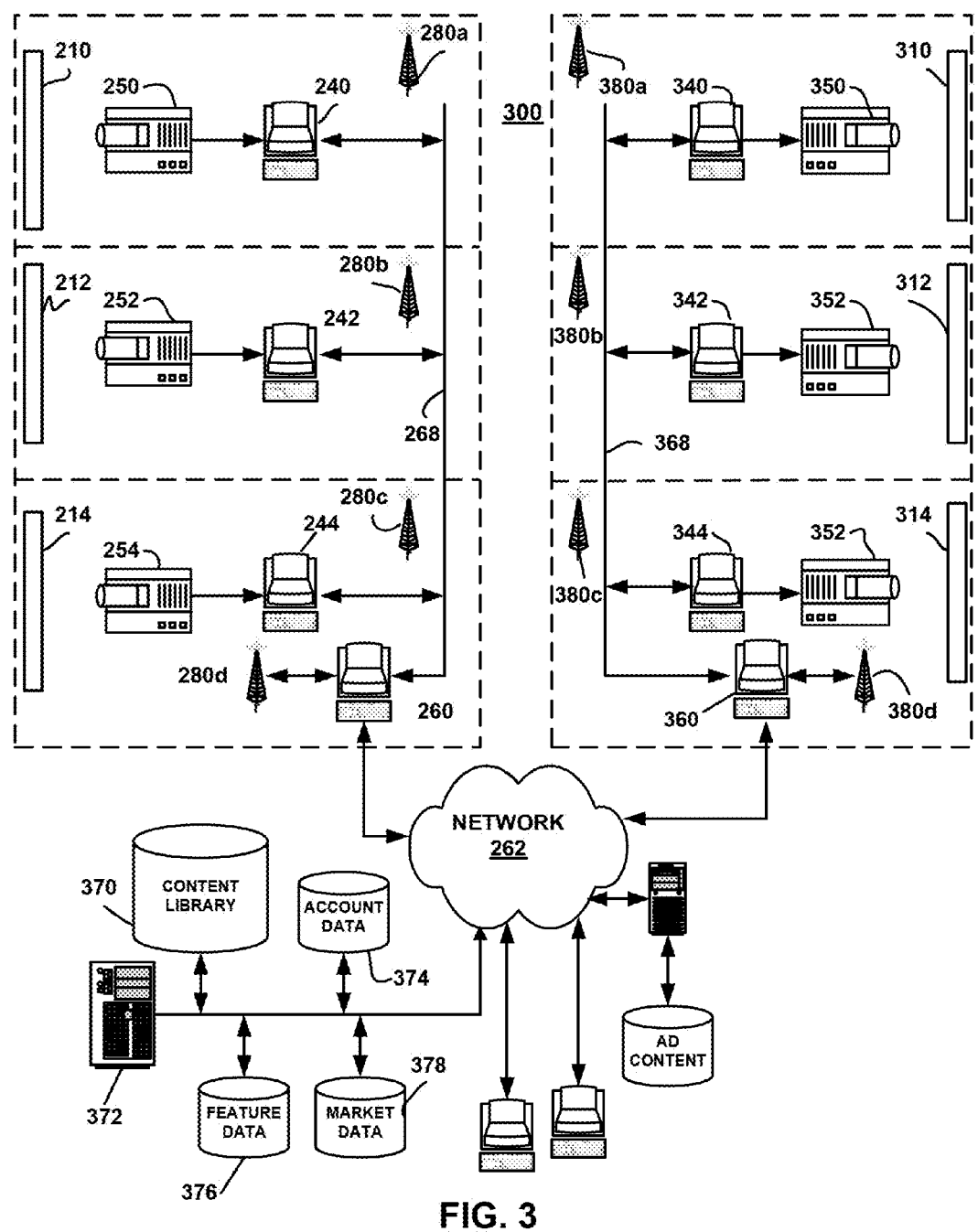
FIG. 3 depicts an illustrative view of the physical architecture of a system for arranging and presenting interactive multiplayer game sessions to one or more audiences of multiple theaters according to one or more embodiments.

Turning now to FIG. 3, there is shown an embodiment of a system 300 configured to enable members of one audience located at a first building (such as building associated with theater 220) to interact, as by playing multiplayer games and/or exchanging messages via a social network, with members of an audience located at a second building, indicated generally at 320. Like system 200 shown in FIG. 2, wherein like elements are referred to by like reference numerals, the overall system 300 may be described physically as an interconnected set of general purpose computers, software, and electronics. These components include central content library 370, central content server 372, databases 374, 376 and 378 that are connected to work stations 260 and 360 at buildings 220 and 320, respectively, via the internet 262, as well as a set of client assemblies that are connected to local administrative servers 260 and 360, respectively, via respective intranets 268 and 368.

Each client assembly includes a client assembly server, as servers 240, 242 and 244 within building 220 and servers 340, 342 and 344 within building 320. Each client assembly further includes a projector as projectors 250, 252 and 254 (building 220) and projectors 350, 352, and 354 (building 320). This grouping of interconnected equipment facilitates centralized management of interactive content but also distributed presentation of interactive content. System 300 differs from system 200 in that local interactive content server 239 and associated local game content store 238 are omitted. That is, instead of providing these latter components at each location, their functions are consolidated at central content server 372 and content library 370, respectively. System 300 further includes a centralized store 230 of advertising content which provides advertising content via advertising server 232 in a manner similar to that described in connection with system 200, above.

In some embodiments, servers as servers 240, 242, 244, 340, 342, and 344, are tasked with receiving, storing, and assembling interactive content for presentation via group display screens 210, 212, and 214 (building 220) and group display screens 310, 312, and 314 (building 320), respectively. The servers are further tasked with rendering interactive content for projection by or to the group display screens. Failures are managed through rapid repair and/or replacement.

According to embodiments, central content server 272, its attendant databases, and its back up (not shown) are geographically located at sites with access to high-quality power and communications services. Geographic redundancy of servers is employed with central administrative server 272 such that in the event of a site failure, a backup server at another site will pick-up the service until the site is restored. Through equipment and site redundancies, there will be no single point of failure for the system as a whole. The physical architecture of the servers and databases may be scaled and partitioned to keep pace with system demand. Clusters will be replicated for redundancy and to reduce the cost of implementing the WAN. The servers will run LINUX (an operating system developed at AT&T now offered by many vendors) or similar operating systems capable of hosting multiple server processes on the same machine and facilitating embodiments of the present invention's logical architecture. Alternate operating systems include, but are not limited to, LINUX (developed by Linus Torvalds of Santa Clara, Calif.), or AIX (sold by International Business Machines of Armonk, N.J.). As in the case of system 200, wireless access points as access points 280a to 280d (building 220) and 380a-380d (building 320) are distributed throughout each building to facilitate exchange of information and signals between system 300 and the plurality of mobile terminal users disposed at each location.

The server computers depicted throughout the various embodiments may be general purpose computers, and may include one or more central processing units (CPUs), random access memory (RAM), and persistent data storage device (e.g. magnetic disk). The CPU executes the software instructions, thereby operating on the data. The instructions and data are staged for execution in RAM. The software and data are primarily maintained in the persistent data storage device. General purpose computers are available from IBM, HP, Sun and many other vendors. The preferred embodiment of the system will make use of one or more types of computer from one or more vendors based on price/performance criteria.

An exhibitor connects the desktop computer associated with a corresponding local administrative server 260 (building 220) or 360 (building 320) via a browser to central administrative server 272 by entering the system's URL (e.g., an Internet web site address) into the browser. The exhibitor enters a user name and password as part of the login process. In an embodiment, script instructions (e.g., PHP, Javascript, Perl, Python, Ruby scripting language instructions) call a login service in transactional services, which, in turn, queries the account database 374 for a match. If a match is found then a session is created under the exhibitor's account and the user is presented with a main page offering a series of options for the scheduling of a pre-show event comprising one or more multiplayer game sessions and social networking interactivity.

Figure 4:
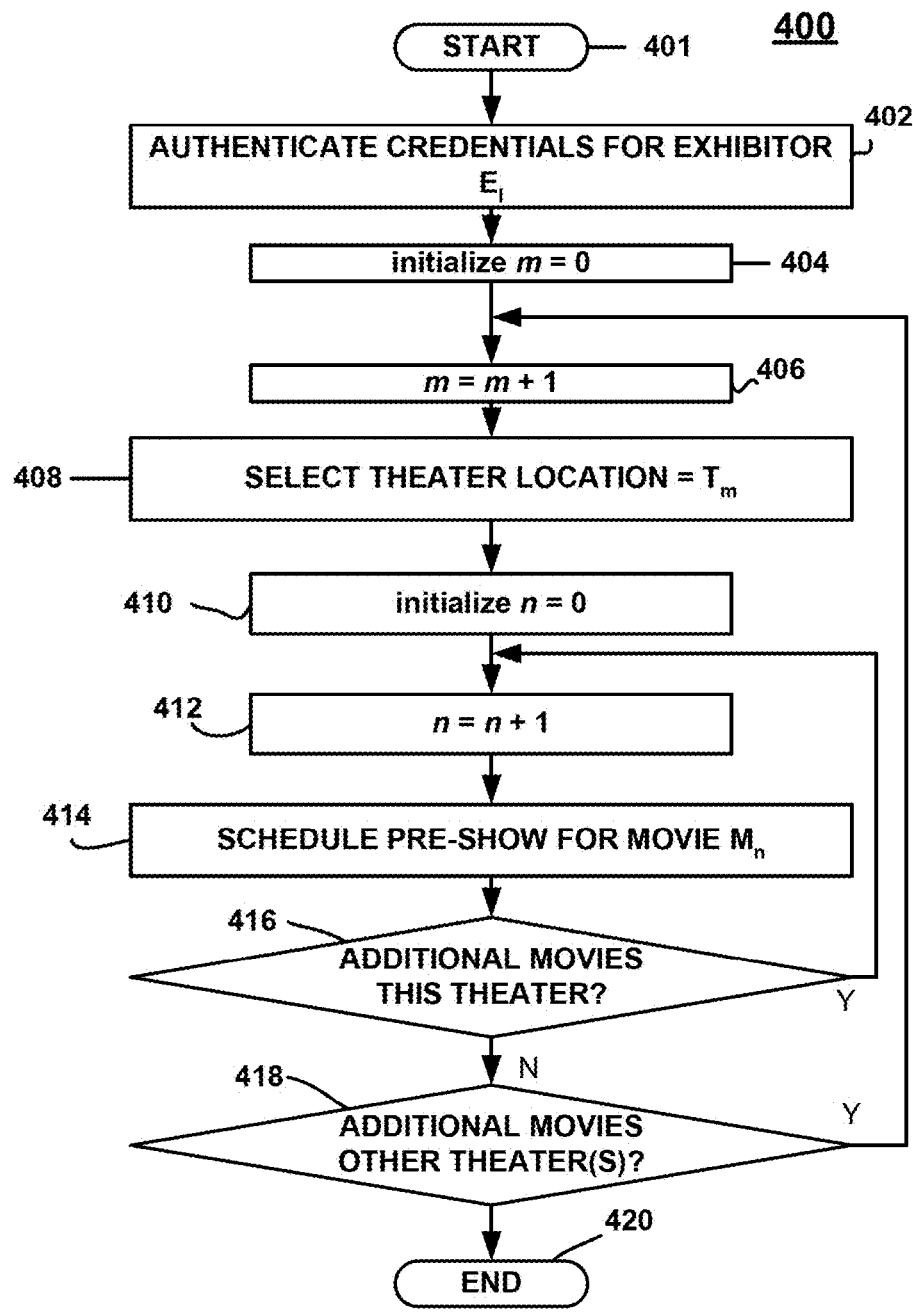
FIG. 4 is a flow diagram of a method for scheduling pre-show events prior to screening of respective movies in one or more rooms in one or more theaters according to embodiments.

An illustrative method 400 for scheduling a pre-show event according to one or more embodiments is shown in FIG. 4. The process is entered at step 401 and proceeds to step 402 where an exhibitor's credentials are authenticated in a conventional manner such as that described above. At step 404 the process is initialized so that pre-show events are scheduled in seriatim for each corresponding feature presentation as movies $M_1$ through $M_n$ and for each theater location operated by exhibitor, as theaters $T_1$ to $T_m$. At step 406, the process increments by one and, at step 408, a first theater location (e.g., $T_1$) is selected by the user. For first theater $T_1$, the schedule-by-movie process is initialized at step 410 and incremented by one at step 412 so that at step 414, that the user schedules a pre-show event for a first movie $M_1$ playing at first theater T1.

The manner in which the user specifies relevant details for scheduling according to one or more embodiments admits of substantial variation. According to some embodiments, for example, the user is presented, at step 414, with a list of titles for currently showing movies from which to choose and for which details such as audience rating (e.g. G, PG-13, R, etc.) and other pertinent data are already pre-populated into feature database 276. An exemplary table of such pertinent data, by feature (movie) is shown in FIG. 5. In other embodiments, the user may be required to enter at least some of the information (e.g., the feature title) manually. Likewise, the user is requested to enter the start time and duration of the pre-show and/or the start time of pre-show and start time of the feature presentation and, optionally, how many interactive game sessions are desired for the pre-show event. In some embodiments, a default of two game sessions of 10 minutes duration each is scheduled to begin and terminate prior to the scheduled start time of the feature presentation.

At decision block 416, the method 400 determines whether the user has any additional pre-show events to schedule for another movie playing at the current theater. If so, the method returns to step 406, increments by one, and the user is prompted to specify another movie (e.g. $M_2$) and one or more further iterations is performed until the user is satisfied that a pre-show event has been scheduled for all required feature showings at the current theater. When this occurs, method 400 advances from step 416 to 418 at which point the method determines whether the user wishes to schedule a pre-show for another location as, for example, theater $T_2$. If so, the process returns to step 506 and the above-mentioned process is carried out for this theater (and all subsequent theaters administered by the user, if desired), in the same manner as already described for theater $T_1$. When the user has no other pre-show events to schedule, the method terminates at step 420. The process 400 is likewise repeated for subsequent Exhibitors as, for example, Exhibitor $E_2$ operating theater $T_3$. The result is the creation of a table within account database 274 having at least the data depicted in FIG. 6.

With the pre-show event having been scheduled, one or more games are selected for play by audience members. According to some embodiments, only multiplayer games which are generally acceptable, as by a lack of violence, offensive language, or other objectively measurable criteria, are selected for use during a pre-show event. In such cases, no mapping or filtering is required. In at least some of these embodiments, however, a subset of games may be selected as being particularly appropriate for a given audience. For example, returning briefly to FIG. 5, it will be seen that certain socio-demographic data may be available for each feature. For example, the child to adult ratio of certain features may be very high for some movies and very low for others. Such information could be used to select one or more appropriate games as compared to others. Alternatively, if the genre for the feature combines science fiction and action adventure (SF A/V), then one or more games consistent with this genre would be more appropriate.

According to some embodiments, the content provider (i.e., provider of a particular game) is running an active promotion or has requested targeting of a certain audience, then such preferences are noted in account database 274, as indicated in FIG. 5 and used, at least in part, to further limit the list of available games for at least a first game session of a pre-show event. According to still other embodiments, and with continued reference to FIG. 5, additional information, such as the presence of certain thematic elements such, for example, as intense violence (IV), adult language (L), strong language (SL), and sexual situations (S), coupled with a low (or non-existent0 child to adult ration, would support a broader selection of games and a coarser (or non-existent) filter for identifying games as candidates.

An illustrative feature movie to game mapping is shown in FIG. 7A. Execution of a selection process according to embodiments of the invention—taking into account one or more of feature start time and/or pre-show event start and end time, as well as a movie to game mapping derived from the aforementioned socio demographic information and/or genre information derived from the movie title and/or other mechanisms—can result in pre-show events which are presented to multiple audiences simultaneously, as depicted in FIG. 7B. Thus, for example, audiences viewing Movie $M_1$ and Movie $M_2$ in the same theater are presented with a single instantiation of games $G_1$, $G_2$ and $G_6$ during the pre-show. As seen in FIG. 5, each of movies $M_1$ and $M_2$ start at the same time and have the same rating (G), making their audiences ideal candidates for a consolidated game instantiation. Although movies $M_4$ and $M_{10}$ may also have the same pre-show starting time (e.g., 13:00) and rating (R), allowances must also be made for the number of people in an audience who wish to participate actively in a given game. As well, according to some embodiments, at least some members of an audience are given the opportunity to vote on which games are to be played during a pre-show event. Comparing the games identified in FIG. 7B as being selected for movies $M_4$ and $M_{10}$, it will be seen that although game $G_6$ will be played by both audiences for the first pre-show event staring at 13:00, one audience will be playing $G_1$ while the other will be playing game $G_2$. Likewise, in subsequent showings, games $G_3$ and $G_5$ are presented to and/or played by members of subsequent audiences for movie $M_4$ while in games $G_2$ and $G_3$ are presented to and/or viewed by members of subsequent $M_{10}$ audiences.

From FIG. 7A, it will be further observed that a few games, namely games $G_3$, $G_4$, and $G_5$, are not suited for all audiences. The content of game $G_5$, for example, is appropriate for audiences admitted to a movie rated PG-13 (e.g., movies $M_3$, $M_5$ and $M_{11}$) or R (e.g., movies $M_5$, $M_7$ and $M_8$), but not for G-rated movies. Likewise, games $G_3$ and $G_4$ contain content which is appropriate for the movies rated R, but not for the "typical" audience attending G or PG-13 rated movies (as determined by reference, for example, to feature information data as tabulated in FIG. 5).

Figure 8A:
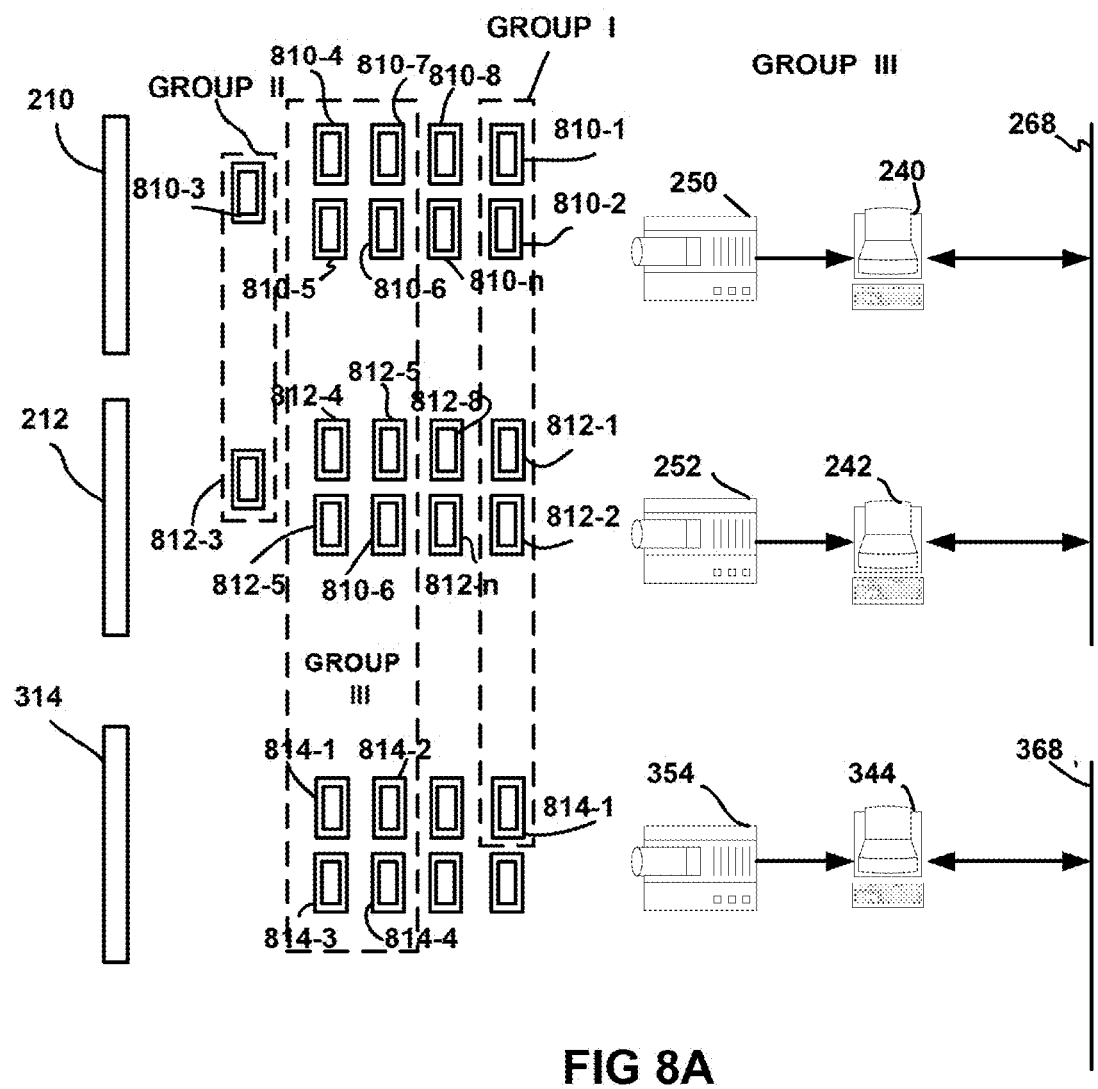
FIG. 8A depicts an illustrative distribution of roles in a single instantiation of a multiplayer game session, across multiple rooms of multiple theaters, according to one or more embodiments.

According to some embodiments, audience member interactions with system 200 (FIG. 2) or system 300 (FIG. 3) are mediated by the mobile terminals of the audience members. Turning now to FIG. 8A, there is shown an illustrative distribution of roles in a single instantiation of a multiplayer game session, across multiple rooms of one or more theaters, according to an illustrative embodiment. Members of a first audience are associated with group display screen 210 and possess mobile terminals 410-1 to 410-n, respectively. The mobile communication terminals are typically smart phones, but may also be PDA's, tablet devices, wearable computer devices or any combination of the foregoing. Likewise, members of a second audience are associated with group display screen 212 and possess mobile terminals 412-1 to 412n, respectively, while members of a third audience are associated with group display screen 314 and possess mobile terminals 414-1 to 414-n, respectively. At least some of the members of one or both of the first and second audience are within a first building and already have visible access to group display screens 210 and 212, respectively, while other members may still be en route to a seating location at the first location. Likewise, at least some members of the third audience are within a second building and already have visible access to group display screens 314, while other members of the third audience may still be enrooted to seating locations at the second location.

According to embodiments, an interactive multiplayer game environment is defined wherein a plurality of sets of rules governing participation in the game are defined, with each respective set of rules being associated with a corresponding role in the game. Eligibility is based on one or more quantitative criteria such as the availability of roles for assignment and one or more qualitative criteria such as qualifying purchases made using a mobile client, social messaging activity, and the like. By way of illustration, at a particular point during a pre-show event, a first group of mobile terminals indicated as Group I in FIG. 4A comprises mobile terminals 410-1 and 410-2, 412-1 and 412-2, and 414-1, a second group of terminals indicated as Group II comprises mobile terminals 410-3 and 412-3, and a third group of terminals indicated as Group III comprises 410-3 to 410-6, 412-3 to 412-6, and 414-2 to 414-5. All other mobile terminals interact with a system, such as system 200 or 300, as non-participants so far as an instantiation of a multiplayer game is concerned. That is, a non-participant can invoke a client application program using his or her mobile terminal in order to request access to a future game instantiation, to place an order for concessions, to interact with the social networking page of screen 10 (FIG. 1A) or screen 10' (FIG. 1B), or to request participation in a current game instantiation in the capacity of an available role.

Each of terminals 410-1 to 410-n, 412-1 to 412-n and 414-1 to 414-n have installed thereon the aforementioned client application, by which the respective devices may be operated to transmit a request to participate in a game instantiation presented to an audience during a pre-show according to one or more embodiments. The requests are processed by local administration server as server 268 or 369 of system 300 (FIG. 3) and the game instantiation(s), as noted previously, are rendered by servers 240, 242 and 340, respectively, to corresponding projectors 250, 252 and 350, respectively. In turn, a common game instantiation is simultaneously projected by the projectors to group display screens 210, 212 and 310, respectively.

Audience members who are the users of mobile terminals within Group I are active participants in the common instantiation of a multiplayer game. That is, they have requested and been granted authorization to participate in the game as direct competitors against one another. As part of system 300, central administration server acts, according to the embodiment of FIG. 3, as an interactive entertainment server. As noted previously, such this function is performed by a local interactive entertainment server 236 as part of system 200 in the embodiment of FIG. 2 In each case, input from the Group I mobile terminals is processed, during a game instantiation, according to a set of rules associated with the role of their users as direct competitors. Likewise, the client application executed by each Group I user's mobile terminal executes software for generating and transmitting game control inputs according to the first set of rules.

In some embodiments, an instantiation of the same screen portion as being rendered to panel 16' of the image on screen 10' is rendered to the respective displays of the corresponding Group I mobile terminals. In some smart phone embodiments, each user enters game control input via touch screen and by reference solely to the display of the terminal itself. According to other embodiments, the set of rules applicable to operation of a Group I mobile terminal are such that movements of the mobile terminal itself and/or depressions of hard buttons temporarily mapped to the client application provide the necessary control input. In this case, a user makes reference to the group display screen rather than to the individual display of his or her mobile terminal.

Audience members who are the users of mobile terminals within Group II are not active participants in the common instantiation of a multiplayer game. Instead, they have requested and been granted authorization to participate in the game according to a different role, governed by a different set of rules. According to one or more embodiments, the Group II mobile terminals are used in support of an administrator role. Broadly speaking, an administrator role is one in which the user possesses an ability to add or modify a rule of the multiplayer game affecting all mobile terminal users actively participating in a single instantiation of a multiplayer game. According to some embodiments, an administrator is granted authority to override a default parameter which would otherwise be in effect by normal operation of the game. Such parameters may, for example, include a default choice of perspective to be rendered to panel 16 of the image on screen 10' (FIG. 1C) during an interactive game session. If supported and enabled by the content creator, one of the administrators (where there are more than one), is also permitted to choose from a number of finite game options such, for example, starting level, finishing level, background color and/or scene selection, track selection (if a racing game), combat style (if a fighting game), music selection, and the like.

According to embodiments, when the mobile terminal of an administrator executes the client application and displays an administrative options menu, the administrator selects options enabling him or her to add, remove or modify a rule of the multiplayer game. This action equally affects all mobile terminal users actively participating as competitors in a single instantiation of the multiplayer game. As further illustrative examples beyond those mentioned above, the rule(s) can relate to the selection or replacement of a specific background theme, specifying a game complexity level, the insertion or removal of obstructions to a path navigated in the game by all participants (e.g., in a racing or virtual world game), the choice of a "boss' to be defeated during a given level, or any other modification to the gaming environment which affects all active competitors in a uniform manner.

Owing to the differing roles and inputs associated with the execution of those roles, the user interface screen presented to the mobile terminal display of a Group II terminal user differs substantially from that presented to a Group I terminal users.

As such, systems 200 or 300 are operative to receive and process user input received from the Group II mobile terminals according to the set of rules associated with one or more administrator's role in the multiplayer game.

According to some embodiments, a third category of role is defined which is governed by yet another set of rules which differs from both the set of rules associated with active competitors and the set of rules associated with administrators. This third category is that of a game instantiation "intervener". According to the set of rules associated with this category of defined role, an intervener is user empowered to modify a rule of the multiplayer game locally affecting an individual mobile terminal user who is actively participating as a competitor in a single instantiation of the multiplayer game, and/or to add to or modify a capability of an individual mobile terminal user actively participating as a competitor in a single instantiation of the multiplayer game. By way of illustration, an instantiation intervener may confer a positive effect on one player or, in the alternative confer a negative effect on another. As a more concrete example of the former, a user of a Group III terminal may invoke a sponsor UI screen of his or her terminal and select from a list of "helper" options such as render first aid, provide ammunition, provide additional equipment, or the like to a favored competitor. As an example of the latter, a user of a Group III terminal may invoke a list of "challenge" or "blocking" options, in which the user moves an obstruction into the path of a non-favored competitor.

In all three of the above-identified cases, it will be appreciated that a distinct set of roles and associated rules all a virtually unlimited number of mobile terminals to participate, in some way, in a single multiplayer game instantiation presented to members of an audience during and as part of a scheduled pre-show event. Of course, one or more of the mobile terminals users may wish to remain entirely passive as to the game itself, but still interact in some way with the screen 10 (FIGS. 1A and 1B) or 10' (FIG. 1C). Thus, for example, a user may invoke yet another UI screen of an installed client application to post messages and related content to the area of the screen reserved for the exchange of social networking messages.

Figure 8B:
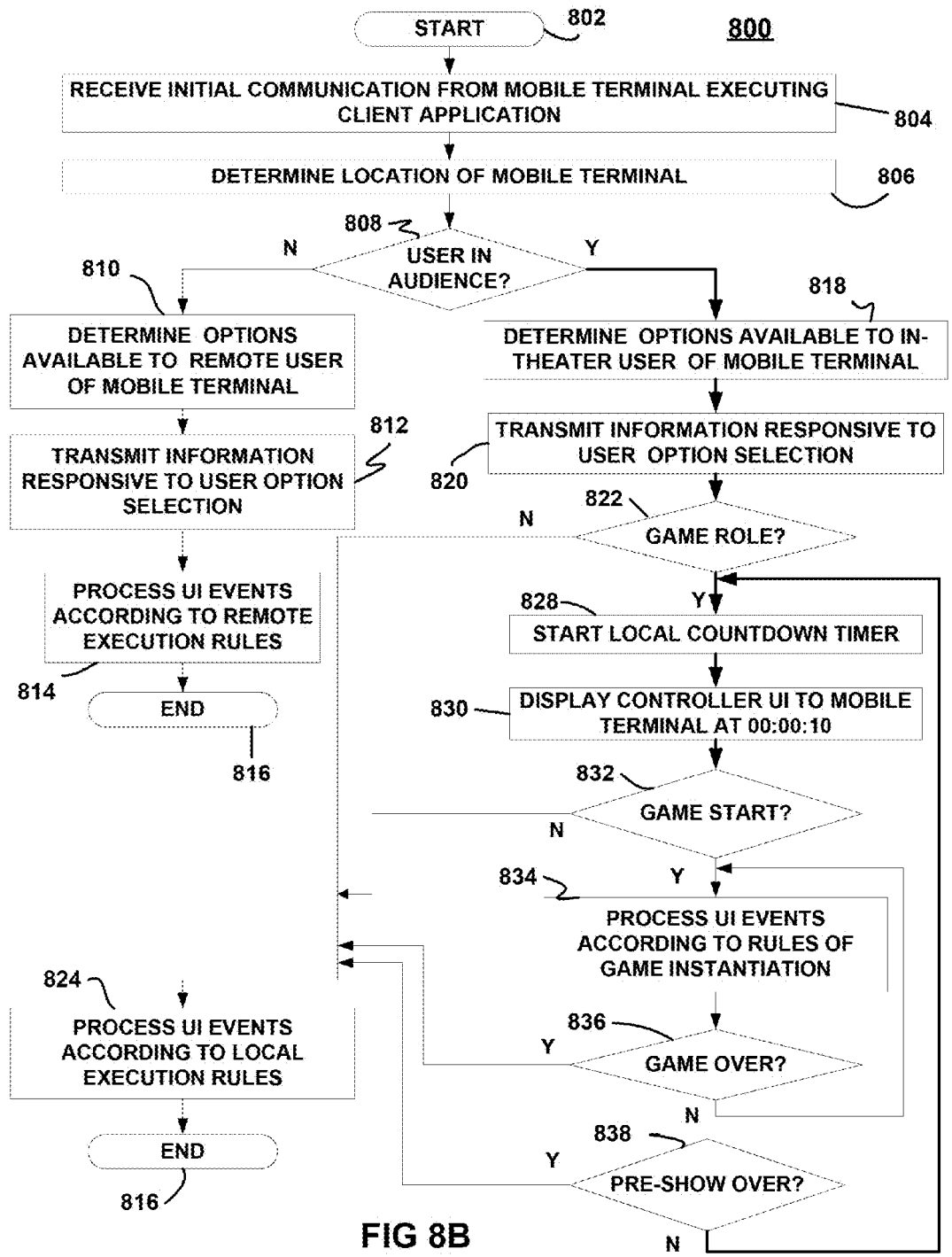
FIG. 8B is a flow diagram depicting the processing of mobile terminal user requests in connection with the set up and presentation of an interactive pre-show event to participants having a role of a plurality of roles and to non-participants in an audience according to one or more embodiments.

With reference now to FIG. 8B, a flow diagram corresponding to a method 800 implementing the functionality exemplified by the embodiments discussion of FIG. 8A will now be described in detail. The method 800 begins at start step 802 and proceeds to step 804. At step 804, the method receives an initial communication from a mobile terminal executing an interactive gaming and entertainment application according to one or more embodiments. The process proceeds to step 806 where the location of the mobile terminal is determined. Any conventional method may be used for this purpose. For example, mobile terminal may simply respond to a location query by determining and reporting its own location. Alternatively, triangulation may be carried out in accordance with a known technique. At step 808, method 800 determines whether or not the mobile terminal and associated user are in the audience. If not, method 800 identifies, at step 810, a list of options available to a remote user. At step 812, information is transmitted to the user's mobile terminal in response to menu option selection(s) invoked by the user and, at step 814, method 800 processes UI events invoked by the mobile terminal according to a set of remote execution rules. The manner in which the events are processed will be described in greater detail shortly by reference to FIG. 9. When no further events remain to be processed at step 814, the method 800 is terminated at step 816.

If, at step 808, method 800 determines that the mobile terminal and associated user are in the audience, the method 800 identifies at step 818 the options available to in-theater users of the mobile terminal and, at step 820, transmits information responsive to user option selection. According to some embodiments, a user option selection is made by one or a series of touch screen events captured over soft buttons rendered to the mobile terminal display. At step 822, method 800 determines whether or not the user has been granted or is requesting participation in a game role. If not, the process 800 proceeds to step 824 so that user interface events are processed according to the local execution rules applicable to those members of an audience not participating in an upcoming game scheduled as part of a pre-show event. At the expiration of the pre-show, the process terminates at step 826 unless earlier terminated by the user.

If, at step 822, method 800 determines that the user of the mobile terminal has been assigned a game role, then at step 828 the process commences and a local countdown timer is started and rendered to the display of the mobile terminal. If the user has not already navigated to the appropriate screen via his or her mobile terminal user interface by ten seconds (or other suitable interval) prior to the game star time, at step 830 the game controller and/or game instantiation UI is caused by the client application to be rendered to the mobile terminal display of the Group I terminals, the administrator UI is caused by the client application to be rendered to the mobile terminal display of the Group II terminals, and the intervener UI is caused by the client application to be rendered to the mobile terminal display of the Group III terminals. Method 800 determines at step 832 whether or not the game is ready to start, and if not, UI events continue to be processed according to local execution rules (e.g., the game controls and other UI inputs associated with game functions and rules are locked). When the game is ready to start, the method 800 proceeds to step 834 and begins processing UI inputs according to rules of the common game instantiation. At step 836, the method determines whether or not a scheduled game is over. If not, the method 800 returns to step 834 and continues to process UI input according to the rules applicable to the user's assigned role in the game. If so, the process proceeds to step 838 and determines whether the pre-show is over or whether an additional game session is to be staged.

If an additional game is to be staged, the process returns to step 828 and the countdown timer is reset and rendered to the display of those mobile terminals that have already been granted a role in the upcoming game instantiation. Alternatively, the process returns to a staging step (not shown) which precedes block 822 and at which point the user of the terminal may follow instructions for requesting participation in the next game being staged. If no further games are scheduled for the pre-show event, then the process returns to step 824 and processes UI events according to the local execution rules applicable after the pre-show period has ended. The rules at this stage, for example, may place the phone in a "theater mode" which prevents the emitting of audible alerting tones by the device but which may still permit such functions as placement of orders for concessions and the like.

Figure 9:
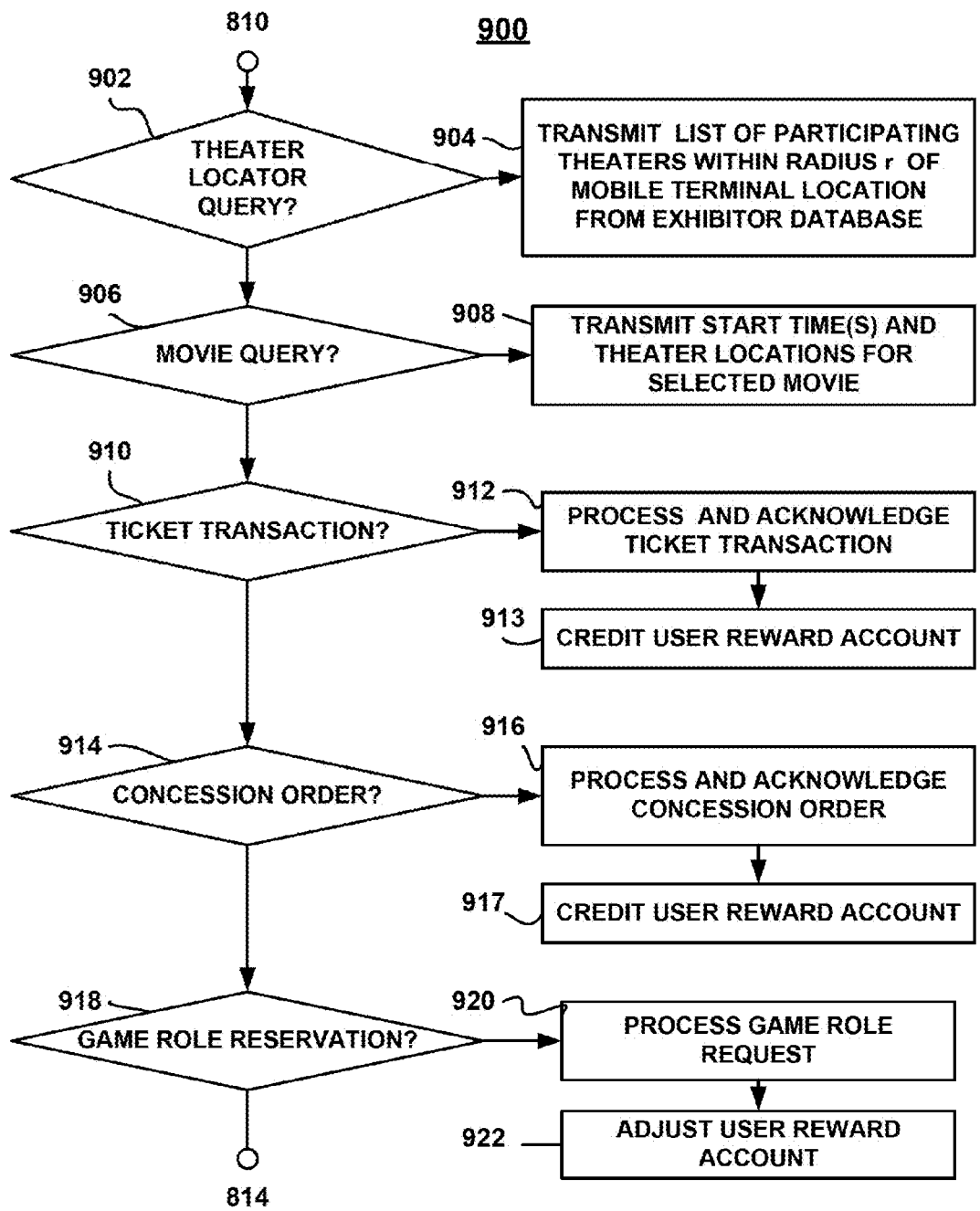
FIG. 9 is a flow diagram depicting the processing of various transactions by users of a mobile terminal who are remotely located relative to a group display screen, according to one or more embodiments.

Turning now to FIG. 9, an exemplary method 900 according to one or more embodiments for implementing step 812 of process 800 (FIG. 8B) will now be described in greater detail. From step 810, method determines at step 902 whether or not a query entered by a user's mobile terminal is a theater locator query. If so, process 900 proceeds to step 904 where a list of participating theaters within radius r of the mobile terminal location is retrieved from an exhibitor database. Non-participating theaters (i.e., those not supporting multiplayer gaming) can also be included. A record of the query and interaction with the mobile terminal user is preferably stored as part of the user's account profile in the market database (such information may, for example, be analyzed to determine when and how often a user followed through by attending a showing at a participating theater vs. a non-participating theater).

In any event, and with continued reference to FIG. 9, a user may further invoke a query regarding a particular movie at step 906, wherein the process proceeds to step 908 and determines and transmits, to the user, the start time(s) and theater locations for a selected movie. The process proceeds to step 910 and determines whether the user of the mobile terminal wishes to utilize the client application to execute a ticket purchase transaction. If so, the process advances to step 912 wherein a secure e-commerce transaction is processed according to a conventional technique (e.g., a credit card purchase transaction or a hand-off to a third party service). According to some embodiments, user loyalty is rewarded through the awarding of incentive points when a ticket is made. Such incentive points are redeemed via discounted purchases, higher priority in granting of game role requests and, in the case of the aforementioned category of game instantiation interveners, purchases of benefits and/or penalties to be conferred by the intervener upon the active competitors. An award crediting step is implemented at 913.

Likewise, at step 914, method 900 determines whether the user wishes to place a concession order so that it is ready for pickup when the user arrives at the theater. If so, the method proceeds to step 916, processes and acknowledges the concession order(s) placed by the user, and at 917 credits the user's incentive account in the same manner as described for the purchases of tickets. At step 918, the user may additional invoke the client application to make a request for a game role reservation associated with one or more ticket(s) just purchased via step 912. If so, the process proceeds to step 920 and the user's request to participate as an active competitor, an administrator or an intervener is implemented. If a redemption of award points was a condition of a particular role being conferred upon the user, the user's user reward account is adjusted at step 922. When the user has no further transactions to consummate via invocation of the client application, the process advances to step 814 (FIG. 8B) and further UI events will continue to be processed according to remote execution rules. By way of illustrative example, according to some embodiments a remote user is authorized to place further orders, to make further queries as described earlier, and to post messages to the social networking wall portion of display screen 10 if the pre-show has already begun. Such messaging capability might, for example, be used by a user to alert others who are already in the theater that he or she is on the way and will be bringing refreshments!

Figure 10:
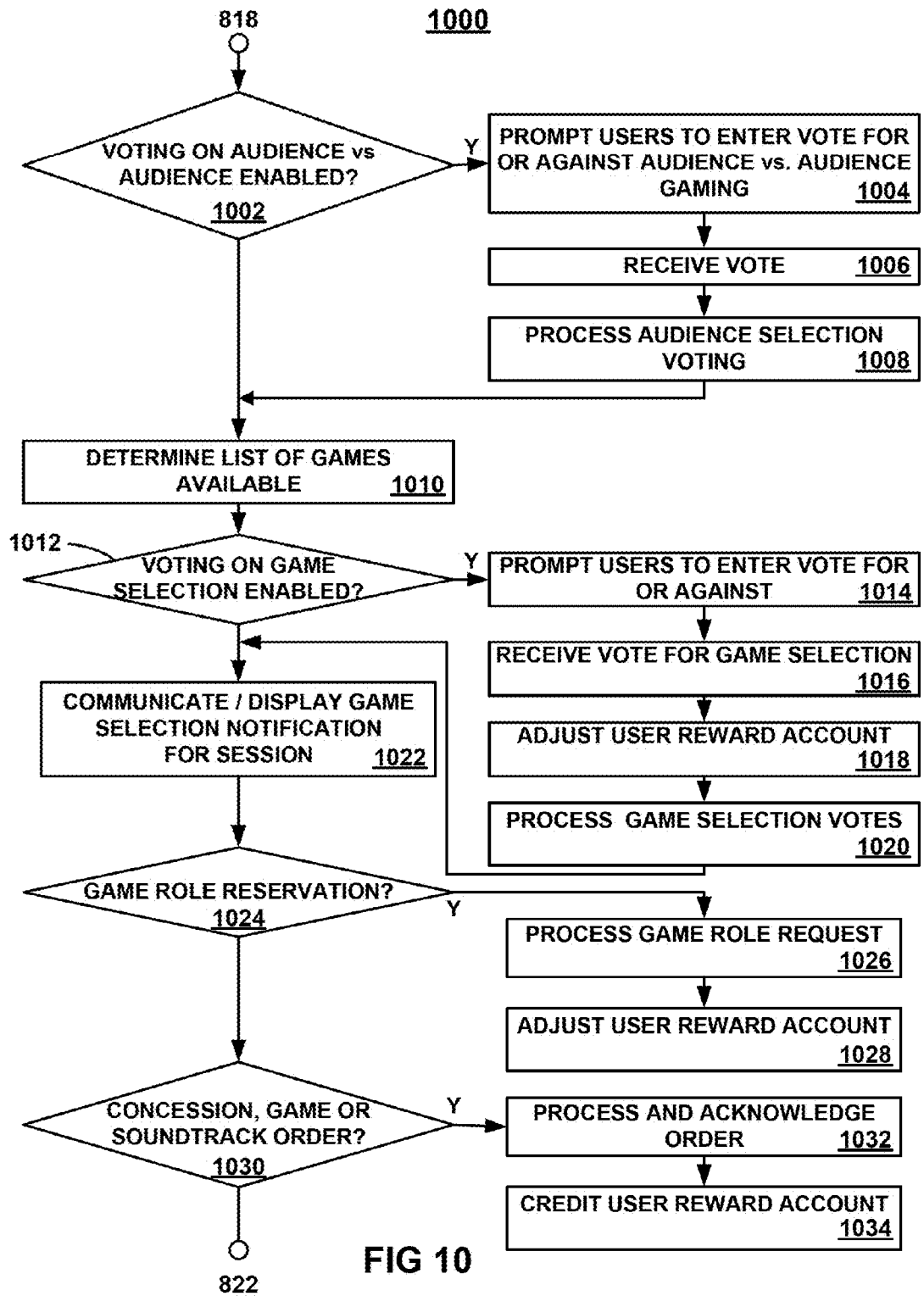
FIG. 10 is a flow diagram depicting the processing of various transactions by users of a mobile terminal who are not remotely located relative to a group display screen, according to one or more embodiments.

With reference now to FIG. 10, an exemplary method 1000 according to one or more embodiments for implementing step 820 of process 800 (FIG. 8B) will now be described in greater detail. From step 818, method determines at step 1002 whether or not members of the audience are granted the option of voting on audience vs. audience capability. According to some embodiments, all forms of voting are open to all mobile terminal devices executing the client application while in other embodiments they are limited to those who have acquired a VIP status as measured by the accumulation of incentive award points. If audience vs. audience competition is an option to be set by voting, then users are prompted at step 1004 to navigate to a screen of the client application user interface to enter a yes or no vote as, for example, by a soft button actuated by touch screen event. Votes are received at step 1006 and the selection is processed at step 1008. If the selection is yes, for example, method 1000 selects one or more audiences according to movie and game rating compatibility, as previously described in connection with FIGS. 5, 6, 7A and 7B.

The process advances to step 1010. At step 1010, the list of games which can be offered to the audiences selected at step 1008 is identified and at step 1012, a determination is made as to whether voting on game selection is enabled. If so, the process proceeds to step 1014 and users are prompted to enter a vote for or against using a mobile terminal executing the client application. Method 1000 receives the votes at step 1016, and if eligibility to vote was conditioned upon redemption of incentive points, then the user's award account is adjusted (debited) at block 1018 and votes are processed at step 1020. The proceeds to step 1022, where the game(s) selected for an upcoming pre-shown event session is or are communicated to the users via the group display screen(s) and users of mobile terminals are invited, during a staging phase, to reserve a role in one or all of the upcoming games. At step 1024, the process 1000 determines whether a user wishes to reserve a role in an upcoming game. If so, the process proceeds to step 1026 and the request to reserve a role as a participant is processed. According to some embodiments, a user is required to redeem incentive points in order to compete as an active competitor and, as such, the reward account of the user is debited at step 1028. If the method 1000 does not determine that the user wishes to reserve a role in an upcoming game, the method proceeds to step 1030 and determines whether the user desires to place a concession, game or soundtrack order. In such event, the process advances to step 1032, the applicable order(s) are processed in a conventional manner, and incentive award points are credited to the user's account at step 1034. The process then proceeds to step 822 of method 800 according to such embodiments as presented in FIG. 8B.

Figure 11:
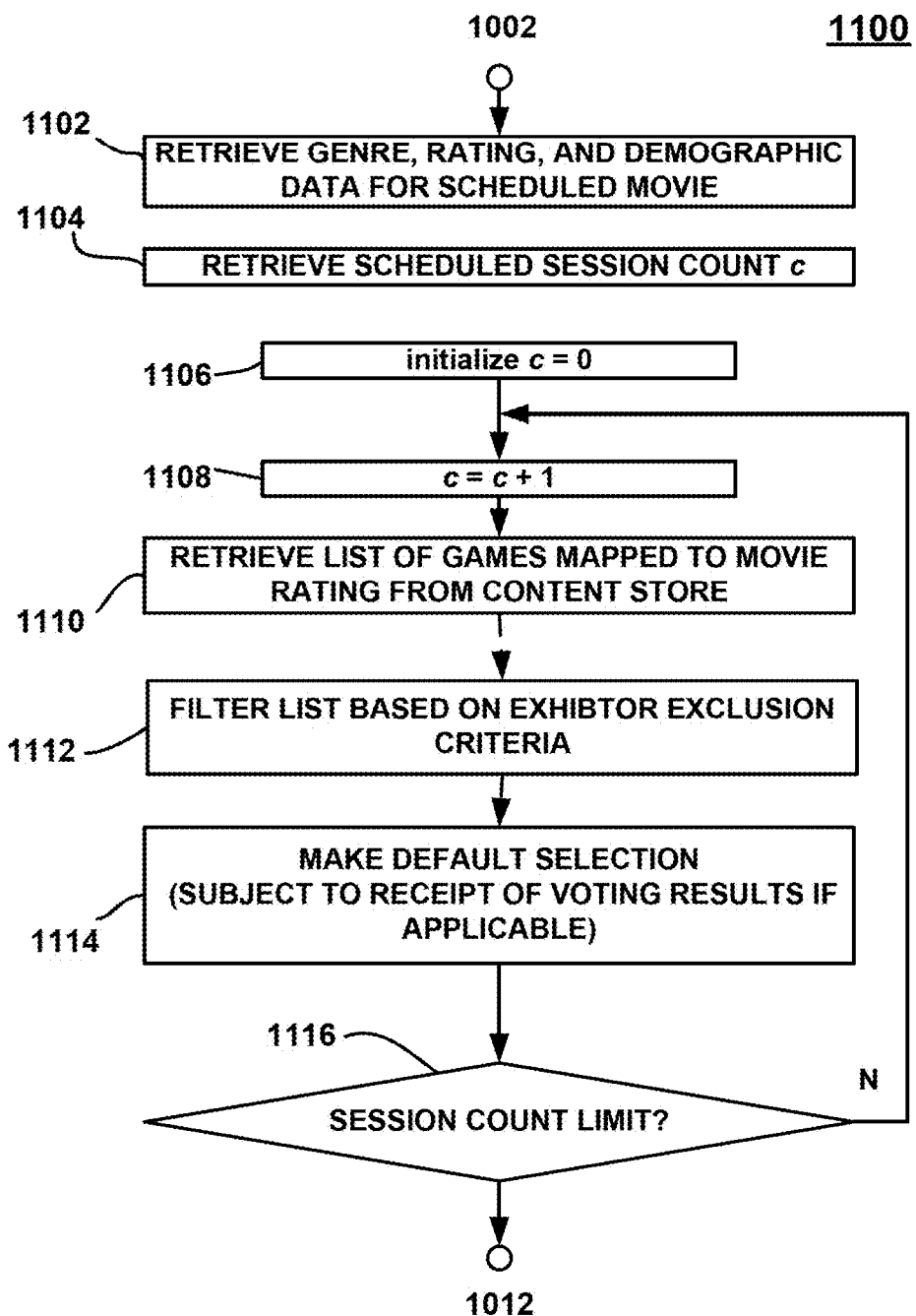
FIG. 11 is a flow diagram exemplifying a process of identifying and selecting one or more multiplayer games to be played as part of a pre-show, according to one or more embodiments.

Turning now to FIG. 11, an exemplary method 1100—for determining a list of games available for presentation and play by members of one or more audiences according to one or more embodiments for implementing step 1010 of process 1000 (FIG. 10)—will now be described. From step 1002 or 1008, as the case may be, method 1100 proceeds to step 1102 and retrieves genre, rating, and demographic data for a scheduled feature movie. The method 1100 advances to step 1104 and retrieves the session count limit c. The session count corresponds to the number of games which will be presented to and played by members of the audience as part of the scheduled pre-show event. According to some embodiments, two game sessions of eight minutes each are included, with an additional two minutes allocated to each of the two game sessions for staging. Once the session count limit is established, the count is initialized at step 1106.

During the staging phase, owners of mobile terminals are invited to install the client application to their phones if they have not already done so, and there is a window of opportunity allocated to the receiving and processing of game participation requests. At step 1108, the session count is incremented by one and at step 1110, the method 1100 retrieves a list of games mapped to the movie rating according to data available in the feature content store 376 (FIG. 3) or 276 (FIG. 2B). Method 1100 proceeds to step 1112 and the list is filtered based on any additional exclusion criteria that an exhibitor (e.g., movie theater operator) specifies. According to some embodiments, the exhibitor may exclude from the list any games for which an insufficient incentive award is being offered by the content providers (i.e., releasers of the demonstration version games which comprise the universe of games from which selections are made). According to other embodiments, the exhibitor may limit the choice of games to those which are universally acceptable to all age groups (consistent with a "G" rating).

The process 1100 then proceeds to step 1114. At step 1114, a default selection is made subject to receipt of voting results, if applicable. According to some embodiments, this is done on a random basis or on a round robin basis so that each game receives "equal time" with respect to a target demographic. According to some embodiments, a fairness algorithm takes into account a number impressions rather than merely the number of times a particular game is presented. Data stored in market database 378 (FIG. 3) for example, can gather statistics on the socio-demographic composition of the audience exposed to prior pre-show events and then make a selection for a current game session based on a current tickets sold count and predicted audience profile. It suffices to say that the manner in which a game is selected for a given game session of the pre-show event admits of substantial variation. Moreover, as noted previously, if audience members are to be given the opportunity to vote on game selection, the foregoing default selection process may be bypassed and the filtered list obtained during step 1112 is presented directly to the audience for a vote. Once the selection is made at block 1114, the process advances to step 1116. At step 1116 the process 1100 determines whether the session count limit has been reached. If so, the process returns to step 1012 of FIG. 10. If not, it returns to step 1108 and increments by one. The aforementioned retrieval, filtering, and default selection steps are repeated and one or more subsequent determinations are made at step 1116 until the session count limit is reached.

Figure 12:
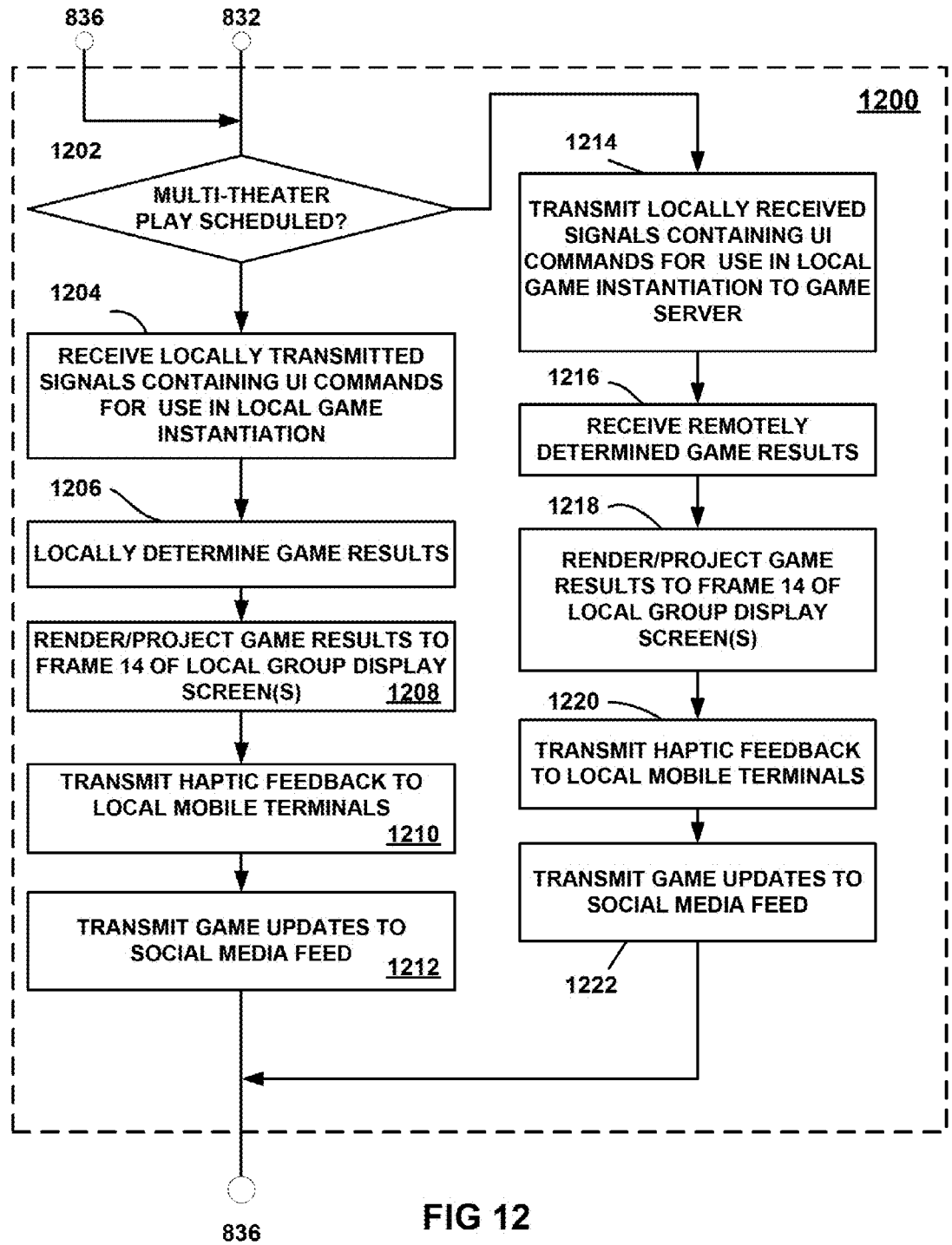
FIG. 12 is a flow diagram exemplifying a process for generating an instantiation of a multiplayer game and rendering to one or more group display screens and a plurality of mobile terminals according to one or more embodiments.

FIG. 12 is a flow diagram exemplifying a process for generating an instantiation of a multiplayer game and rendering to one or more group display screens and a plurality of mobile terminals according to one or more embodiments. More particularly, FIG. 12 is an exemplary process 1200 for carrying out the processing user interface events according to rules of a game instantiation such as represented by step 834 of process 800. As such, the process 1200 begins at step 1202 with a determination of whether or not intra-theater play (wherein all game participants are located within the same audience or at least within the same building) or inter-theater play (where some game participants are part of an audience in one building and other game participants are part of an audience in another building.

If at step 1202 it is determined that all game participants are located within the same audience or theater, then at step 1204 the method receives locally transmitted signals containing user interface (UI) commands for use in a local game instantiation. According to some embodiments, the UI commands are entered as a series of touch screen events as the user operates his or her mobile communication terminal with reference to a version of the local game instantiation rendered thereon by system 200 (FIG. 2B). Alternatively, the commands are entered by movements of the device itself. By way of illustration, an accelerometer within a smart phone generates an output signal such that rectilinear or curvilinear gestures along a lateral path (side to side direction) can be distinguished from rectilinear or curvilinear gestures along a vertical path. According to some embodiments, such output signals are interpreted by system 200 so that the user may operate the mobile terminal as a controller without actually having to rely on the mobile terminal display during play.

At step 1206, the process locally determines game results at a local interactive entertainment server as entertainment server 236 of system 200. At step 1208, the process renders game results to frame 14' of the image on screen 10' being one or more local group display screen (FIG. 1C). Remaining with embodiments exemplified by FIG. 2, for example, server 240 renders the game results to projector 250 and the frame is rendered to group display screen 210. At block 1210, an instruction causing the client application being executed, by active participants in a game session, to initiate hap tic feedback (e.g., by activating the vibrating module of the mobile communication terminal). According to some embodiments, game updates such as scores and key milestone events (high score for a level, record completion type, or the like) are presented to members of the audience via the social networking feed and/or by updates to a high scoring display screen which can be invoked by a user via his or her own terminal. In the former case, the updates are initiated by transmission of instructions from interactive entertainment server 236 to a client server such as server 240. Server 240 causes projector 250 to project the updated wall feed to the portion of display 10' reserved for a live social media feed.

If at step 1202, process 1200 determines that intra-building (multi-theater play is scheduled), then the process proceeds to step 1214. At step 1214 locally received signals, containing UI commands from one or more mobile terminals for use in a local game instantiation, are transmitted to centrally located game server as art of server 370 of system 300 (FIG. 3) for remote determination of results reflecting the multi-theater game instantiation. Continuing with FIGS. 3 and 12, the method 1200 receives the remotely determined game results at step 1216 and causes the game results to be rendered by client servers as client server 240 of building 220 and client server 340 of building 320. The screens 210 and 310, respectively, are continuously updated by projection of the rendered game results by servers 240 and 340 by performance of step 1218. Haptic feedback is transmitted to mobile terminals at step 1220 and game updates are transmitted to the displayed social media feed at step 1222. The process then continues to determination step 836 of method 800 as shown in FIG. 8B.

Figure 13A:
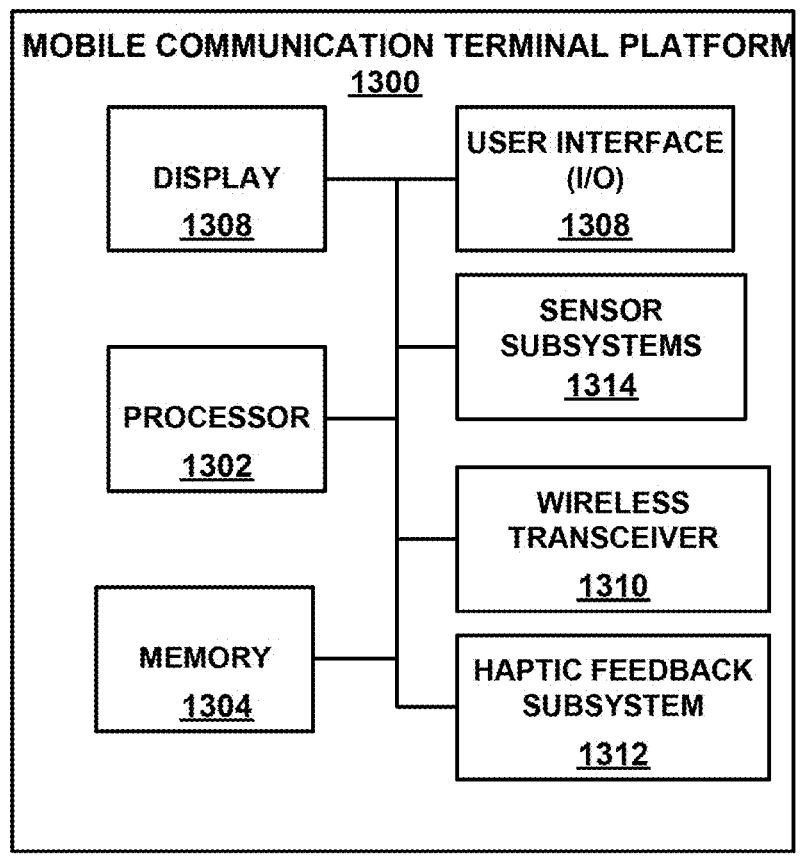
FIG. 13A is a block diagram depicting an exemplary mobile communication terminal for use in interacting with an interactive group entertainment system according to one or more embodiments.

FIG. 13A shows a schematic representation of the main components of an example computing platform of a client or mobile device, according to various particular embodiments. In particular embodiments, control, computing platform 1300 comprises at least one processor 1302, memory 1304, and input/output subsystem as user interface 1306. The at least one processor 1302 is configured to execute instructions and to carry out operations associated with a computing platform. In various embodiments, processor(s) 1302 can be implemented as a single chip, multiple chips, and/or other electrical components including one or more integrated circuits and printed circuit boards. Processor 1302 may optionally contain a cache memory unit for temporary local storage of instructions, data or computer addresses. By way of illustration, using instructions retrieved from memory, processor 1302 may control the reception and manipulation input and output data between components of platform 1300. For example, processor 1302 may include one or more processors or one or more controllers dedicated for certain processing tasks of platform 1300, for example, for 2D/3D graphics processing, image processing, or video processing.

Processor(s) 1302 together with a suitable operating system operate to execute instructions in the form of computer code and produce and use data. By way of non-limiting example, the operating system may be Windows-based, Mac-based, or UNIX or Linux based, Android-based, or Symbian-based, among other operating systems. According to embodiments, the operating system, other computer code and/or data are physically stored within memory 1304 that is operatively coupled to processor 1302. Memory 1304 encompasses one or more storage media and generally provides a place to store computer code (e.g., software and/or firmware) and data that are used by computing platform 1300. By way of example, memory 1304 includes various tangible computer-readable storage media including Read-Only Memory (ROM) and/or Random-Access Memory (RAM).

As is well known in the art, ROM acts to transfer data and instructions uni-directionally to processor 1302, and RAM is used typically to transfer data and instructions in a bi-directional manner. Memory 1304 can also include one or more fixed storage devices in the form of, by way of example, hard disk drives (HDDs), solid-state drives (SSDs), flash-memory cards (e.g., Secured Digital or SD cards, embedded MultiMediaCard or eMMD cards), among other suitable forms of memory coupled bi-directionally to processor 1302. Information may also reside on one or more removable storage media loaded into or installed in computing platform 1300 when needed. By way of example, any of a number of suitable memory cards (e.g., SD cards) may be loaded into mobile terminal platform 1300 on a temporary or permanent basis.

User interface 1306 comprises one or more input and output devices operably connected to processor 1302. For example, interface 1306 can include one or more buttons, thumb wheel, and/or display (e.g., liquid crystal display (LCD), light emitting diode (LED), Interferometric modulator display (IMOD), or any other suitable display technology). Generally, input devices are configured to transfer data, commands and responses from the outside world into computing platform 1300. The display 1308 is operatively coupled to processor 1302 and is generally configured to display a graphical user interface (GUI) that provides an easy to use visual interface between a user of the mobile terminal platform 1300 and the operating system or application(s) running on the mobile device. Generally, the GUI presents programs, files and operational options with graphical images. During operation, the user may select and activate various graphical images displayed on the display in order to initiate functions and tasks associated therewith. According to embodiments, user interface 1306 also includes touch based devices such as touchpad or touch screen overlay. A touchpad is an input device including a surface that detects touch-based inputs of users. Similarly, a touch screen is a display that detects the presence and location of user touch inputs. User interface 1306 may also include dual touch or multi-touch displays or touchpads that can identify the presence, location and movement of more than one touch inputs, such as two or three finger touches.

In particular embodiments, mobile terminal platform 1300 additionally comprises an audio subsystem (not shown), wireless communication subsystem 1310, haptic feedback subsystems 1312, and sensor subsystems 1314, operably connected to processor 1302 to facilitate various functions of mobile terminal platform 1300. For example, an audio subsystem typically includes a speaker, a microphone, and a codec module configured to process audio signals, and is utilized to facilitate voice-enabled functions, such as voice recognition, voice replication, digital recording, and telephony functions. Haptic feedback subsystem 1312 includes a vibrating element which is typically used for so-called silent telephony modes of operation. Wireless communication subsystem 1310 can be designed to operate over one or more wireless networks, for example, a wireless PAN (WPAN) (such as, for example, a BLUETOOTH WPAN, an infrared PAN), a WI-FI network (such as, for example, an 802.11a/b/g/n WI-FI network, an 802.11s mesh network), a WI-MAX network, a cellular telephone network (such as, for example, a Global System for Mobile Communications (GSM) network, an Enhanced Data Rates for GSM Evolution (EDGE) network, a Universal Mobile Telecommunications System (UMTS) network, and/or a Long Term Evolution (LTE) network). Additionally, wireless communication subsystem 1310 may include hosting protocols such that mobile terminal platform 1300 may be configured as a base station for other wireless devices or as a node in a distributed peer-to-peer configuration.

Sensor subsystem 1314 may include one or more sensor devices to provide additional input and facilitate multiple functionalities of mobile terminal platform 1300. According to one or more embodiments, sensor subsystems 1314 include a GPS sensor for location positioning, an accelerometer for determining orientation and rate and direction of motion of the mobile terminal platform 1300.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a MultiMediaCard (MMC) card, an embedded MMC (eMMC) card, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101.

Stored within memory 1304 are instructions for implementing the local user interface functions associated with the operation of mobile terminal platform 1 to process and transmit game control inputs to and receive, and process haptic feedback returned from, a local or central interactive entertainment server according to one or more embodiments. According to particular embodiments, the common instantiation of the game depicted in one or more group display screens is likewise rendered to display 1308 by execution of client application instructions by processor 1302.

Figure 13B:
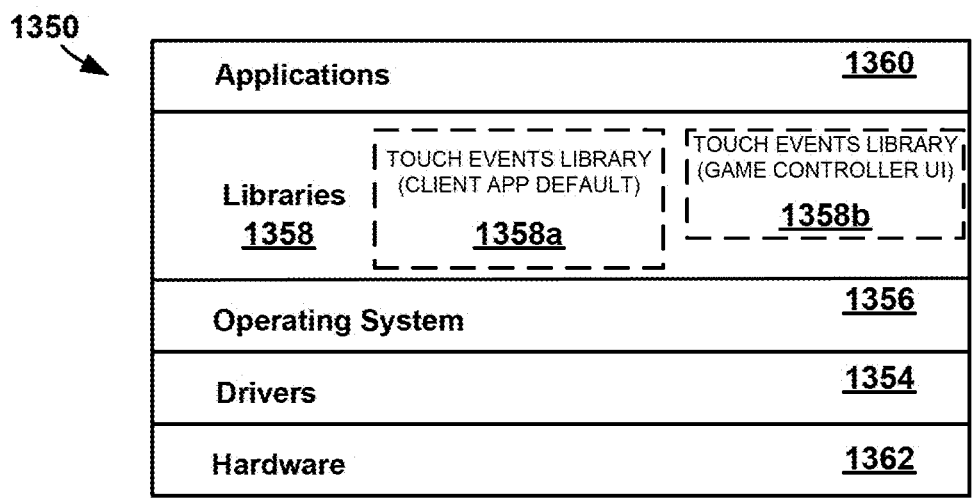
FIG. 13B is a tabular representation of a processing stack for a mobile communication terminal having a touch based input device and adapted to interact with an interactive group entertainment system according to one or more embodiments.

FIG. 13B illustrates an example processing stack 1350 of a mobile terminal (e.g., a smart phone) with touch-based input device(s). Hardware layer 1352 is implemented by one or more processors as processor 1302 of FIG. 13A and by various hardware input/output devices such as a camera, communication interface, and touch-based input device (e.g., touch screen, touchpad, etc.). Drivers layer 1354 includes one or more drivers that communicate and control hardware layer 1352, for example, a driver receiving and processing touch input signals generated by a touch-screen display. Operating system 1356 runs computing programs such as embodiments of an interactive entertainment client application according to embodiments and also manages hardware layer 1352 via one or more drivers in driver layer 1354. Libraries 1358a and 1358b include one or more libraries used by one or more application programs in applications 1360 (e.g., web browser, address book, and embodiments of an interactive entertainment client application). For example, touch events library 1358a can contain computer program code that interprets touch inputs to touch events or gestures. Embodiments of a client application program 1362 for transmitting, receiving, processing and rendering game control inputs and outputs in association with embodiments of an interactive entertainment system can access touch event library 1358*a* (e.g., via function calls) and process the game instantiation inputs with touch event handlers embedded within the application. A browser client or other applications for entering input associated with the secondary participant roles of administrator and intervener may also operate in connection with touch event handlers contained within the context of the client application.

Figure 14:
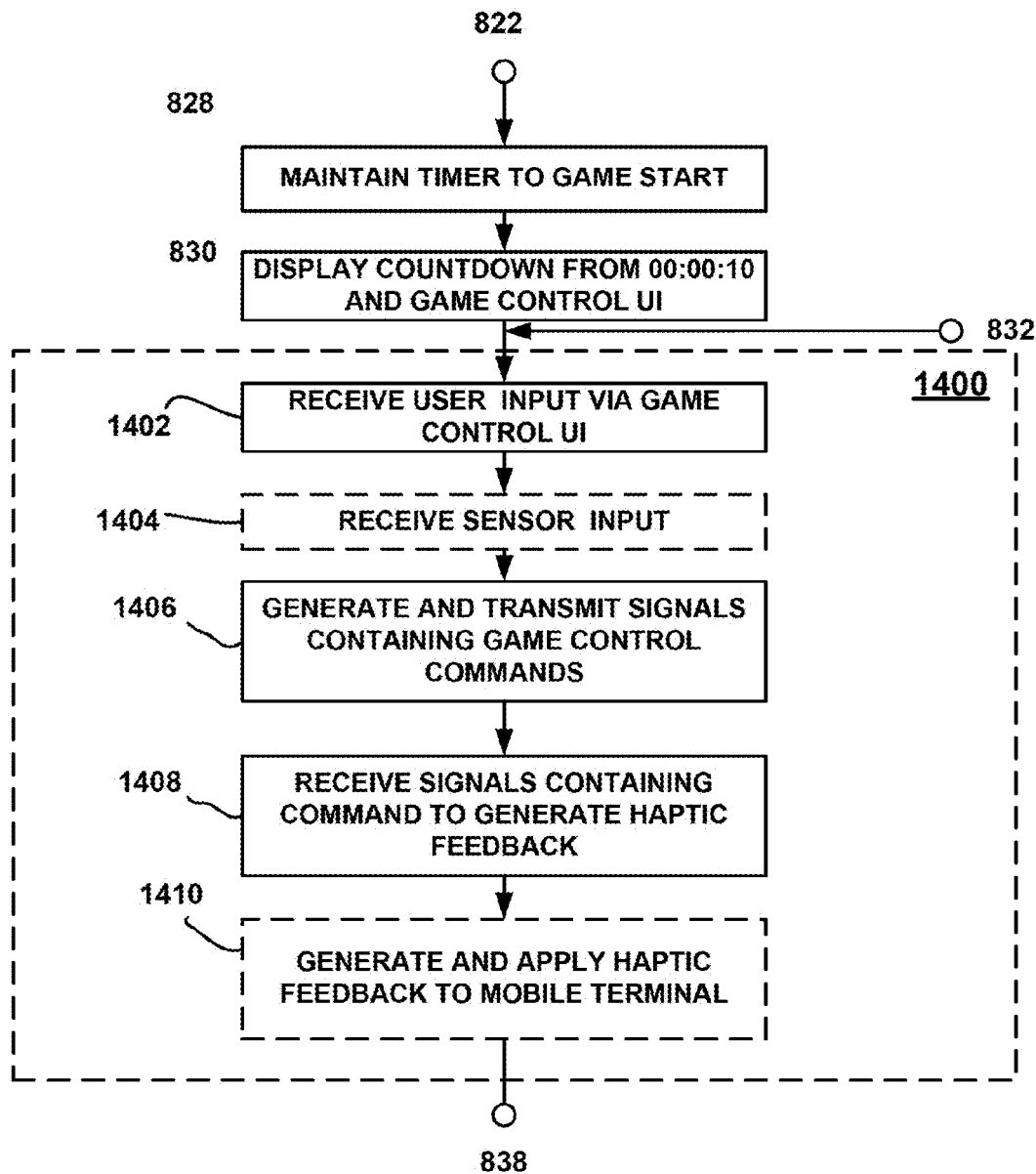
FIG. 14 is a flow diagram of a process for using a mobile communication terminal of the type exemplified by FIGS. 13A and 13B to supply touch based input during play of an interactive multiplayer game according to one or more embodiments.

FIG. 14 is a flow diagram of a process 1400 for using a mobile communication terminal of the type depicted in FIGS. 13A and 13B to supply touch based input during play of an interactive multiplayer game according to one or more embodiments. Process 1400 incorporates some of the steps depicted in FIG. 8B, including step 828 for starting, maintaining and displaying to the mobile terminal user a local countdown timer as part of the UI screen. Control inputs are locked so far as the common game instantiation is concerned, but the client application executing on the active participant's mobile terminal device is fully prepared to begin processing (generating and transmitting) of control input to the interactive entertainment server once the game instantiation begins at step 830.

Once the timer decrements to zero and the game starts, as shown in step 832 of the method 800 from FIG. 8B, the process of using mobile terminal platform 1300 (FIG. 13A) as a game controller for a common instantiation begins at step 1402. At step 1402, process 1400 receives user input via the user interface displayed to the touch screen of terminal 1306. Optionally, at step 1404, sensory input as produced by an accelerometer and/or camera is also generated. At step 1406, the aforementioned control inputs are generated and transmitted via the wireless interface 1310 (FIG. 13A) to a base station associated with the interactive entertainment server. According to some embodiments, the information carried by wireless signals received from multiple terminals participating in a game instantiation is forwarded to local interactive entertainment server 236 of system 200 (exemplified by FIG. 2). One or more processors of entertainment server 236 execute locally stored instruction according to its role as a game server.

According to other embodiments, the information carried by the wireless signals received by the base station is forwarded to a local administrative server, as servers 260 or 360 forming part of system 300 in FIG. 3. Each local administrative server forwards the data packets representing the control input received from the mobile terminals for which it is responsible to remote administrative server 372. As noted previously, according to some embodiments, remote server 372 provides game server functionality on a centralized basis to multiple theater locations as part of the operation of 300.

Without regard to the manner in which the control input supplied from the mobile terminals is processed by a server according to embodiments of the invention, the process proceeds to step 1408 wherein game instantiation updates to be rendered as feedback to each actively participating terminal are received by such terminals. According to the some embodiments, the client application executing on each mobile terminal processes the feedback so as to cause the display to be continually updated. In some embodiments, this will match the game instantiation being displayed. At step 1410, an optional step of generating and haptic feedback, as by the processor of the mobile terminal executing an instruction to activate its vibrate alerter module (commonly provided in smart phones for so-called silent modes of operation), is performed responsive to the feedback wirelessly received at the mobile terminal.

In many computer games, there is a virtual world or some other imagined playing space where a player/user of the game controls one or more player characters, which can be considered in-game representations of the controlling player. A game display can display a representation of the character, a partial representation of a character or no representation of a character. A game program locally or remotely executing on an interactive entertainment server according to one or more embodiments accepts inputs from the mobile terminal, determines character actions, decide outcomes of events, adjusts the state of one or more data objects representing characters, non-player characters and other elements of the game, and continually transmits updates to the mobile terminals of active game participants to cause the displays thereof to render the objects for display.

In many computer games, there are various in-game actions that a character can make with a game. For example, a character in a car racing game can select a particular car the character drives, make various maneuvering actions with the car (e.g., left turn, right turn, accelerate, break, etc.), check status of the race (what's the score, how many miles left in the race, course condition, etc.). For example, a character in a first person shooting game can select or change a weapon, aim the weapon at a particular target, fire the weapon, reload ammunition, survey the surroundings, make various actions within the battlefield, etc. A character in an online poker game can play at specific tables, place bets of virtual currency for certain amounts, play or fold certain hands, play in an online poker tournament, etc.

One or more players can access a computer game hosted by one or more of the aforementioned servers by reference to the display projected to the group display screen and/or to the display of the mobile terminal itself. For example, a game display can be a graphical user interface of the game instantiation as a special-purpose client application or a web browser for an online game.

Figure 15:
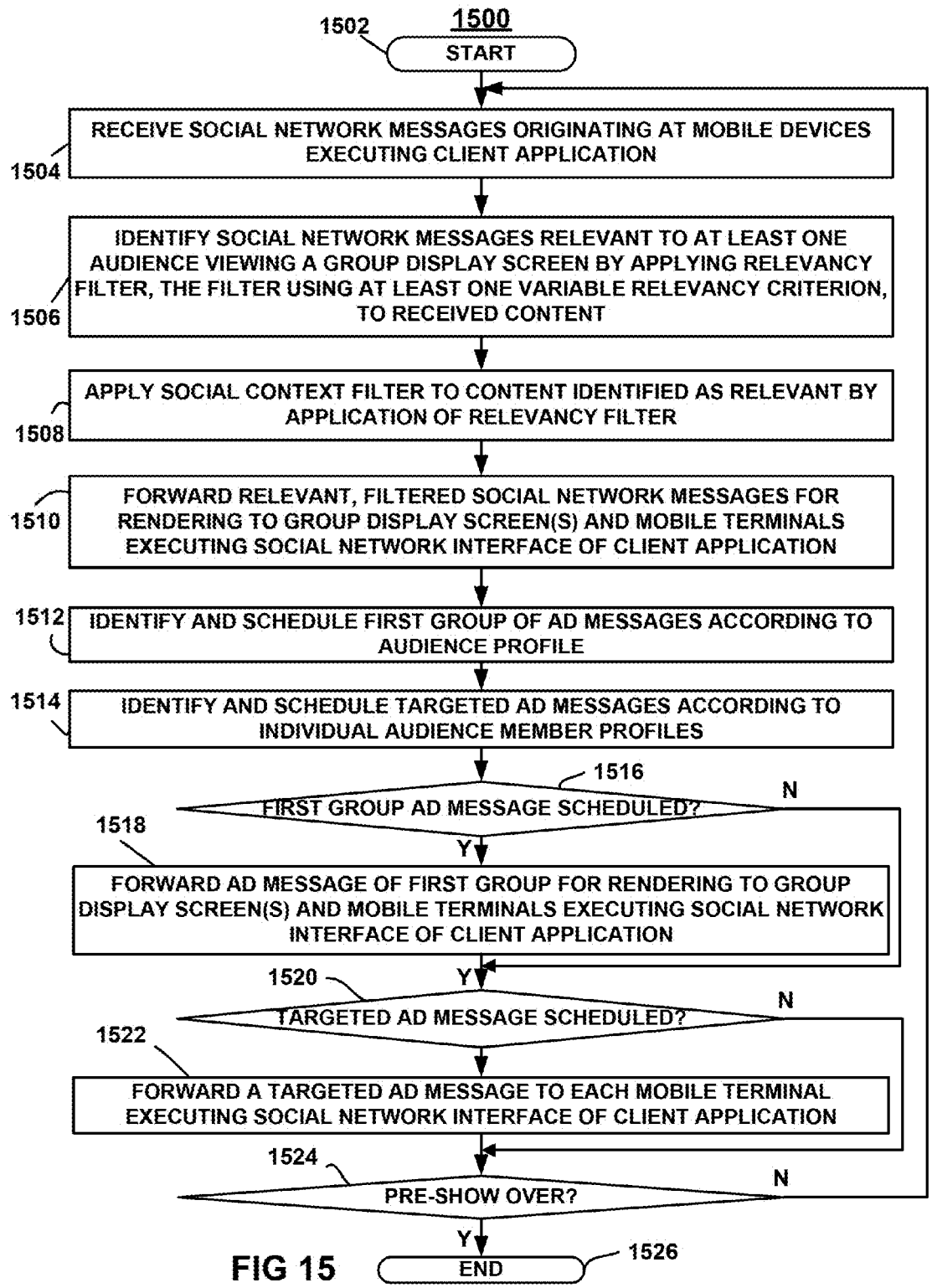
FIG. 15 is a flow diagram of a process for arranging and presenting social network messages to one or more groups having visible access to a group display screen, according to one or more embodiments.

FIG. 15 is a flow diagram of a process 1500 for arranging and presenting social network messages to one or more groups having visible access to a group display screen, according to one or more embodiments. Each of the messages originates at, and is received from, one of a plurality of mobile devices executing a client application. A server receives the messages and forwards at least some of them to a projector, which in turn projects the messages to the display screen as posts within a social network "page". Concurrently, the received messages are transmitted over a wireless local area network to mobile terminals executing the client application. The client application initiates display of the messages within a corresponding social network page.

Each message, in some embodiments, has a numeric character limit to accommodate the simultaneous presentation of ten to twenty messages at one time. By way of illustrative example, a character limit of 150 to 200 characters is imposed. In some embodiments, a character limit compatible with other social network interfaces as, for example, Twitter, is imposed and, if the option is enabled by a user, that user's messages are simultaneously posted to a Twitter, Facebook or other page maintained by the operator of system 200. A uniform resource locator (e.g. an HTML address pointing to a particular web page or frame of a web page) included within a message allows the mobile terminal user executing the social networking feature of the adjunct client application to navigate to the page by opening a companion web browser. In some embodiments, only certain types of messages (e.g., advertising messages) are permitted to include a URL, while any messages originating at a user's mobile terminal and including a URL component are automatically discarded upon receipt.

According to some embodiments, a message posting frequency limit is also applied to messages originating at any one mobile terminal executing the adjunct client application. In some embodiments, a pre-defined absolute limit (cap), a window of default duration, or a window having a user-selectable duration of, say, one to five minutes is imposed so that no one mobile terminal user may dominate the list of messages appearing in the social network page forming part of an interactive preshow. In some embodiments, a numeric frequency cap or window duration is dynamically determined. The determination is based, in some embodiments, on the number of messages residing in a queue and awaiting projection to the group display screen. As an example, if there are no messages in a queue, then a message from a user who would otherwise be in violation of a frequency cap is eligible for selection and projection to the display screen depending on whether any other applicable filter criteria apply.

According to embodiments, and as supported by the multiple panel preshow display configuration exemplified by FIGS. 1A-1C, a subset of the messages are presented to members of a pre-show audience within a social network panel forming part of a multi-panel preshow display. The exemplary process of FIG. 15 will be described with reference to the generalized system 200, for arranging and presenting an interactive preshow, shown in FIG. 2A. The process 1500 is started at step 1502 and proceeds to step 1504. At step 1504, a server as local server 204 of system 200, receives social network messages originating at mobile terminal devices 206 executing adjunct client application 298.

According to some embodiments, all of the messages received by the method at step 1504 are received in real time (i.e., upon being generated and transmitted by a mobile terminal). In some embodiments, some or all of the messages received by the method at step 1504 originate from the mobile devices used by members of one or more audiences to whom an interactive pre-show is being currently presented on a group display screen. In some embodiments, however, at least some of the messages received by the method at step 1504 were collected from members of one or more audiences of an earlier pre-show. Such non-real time messages are time stamped at the time of collection, and stored in a database so that they are available for retrieval and inclusion as part of a subsequent pre-show.

In some embodiments, some of the messages received by method 1500 at step 1504 are received from any mobile terminal configured to execute the adjunct client application, and without regard to the mobile terminal's location, its user having participated in or seen a pre-show or feature presentation, or any other exclusionary criterion. The method proceeds to step 1506, where a relevancy filter comprising at least one variable relevancy criterion for including or excluding some of the messages, received by the method at step 1504, from presentation to a group display screen according to one or more embodiments.

According to some embodiments, the relevancy filter applied at step 1506 of method 1500 includes one or more criteria for including received messages based on their relevancy to an audience attending an interactive preshow preceding a feature presentation. Illustrative examples of variable relevancy criteria for use in including a messages in a subset of messages identified and selected for presentation to the audience, according to one or more embodiments, include geographic proximity of the message originator (or a location identified in a received message) to the location of the applicable group display screen(s) (e.g., within a pre-defined radius). Another example of an inclusionary criterion is the presence of one or more key words, in a message, identified as being relevant to a particular audience. The identification of key-words or key-phrases applicable to currently displayed components of the pre-show, or to the feature presentation with which the pre-show is associated, can be identified in advance and stored in a database for use in the relevancy filter.

According to one or more embodiments, key words and phrases are identified and stored for each game stored in the game content library. The key words might include the name of the game(s), the game developer, the phrases "highest score" and "new high score", the username(s) of current active participants in a pre-show game, the username(s) of one or more game administrators, and the names of one or more interveners. With respect to a particular pre-show, those key words and phrases corresponding to a game being concurrently projected to a particular screen are employed in the relevancy filter applied to messages received at step 1504. When evaluating previously stored social network messages as possible candidates for inclusion in the social network panel according to embodiments, those messages including at least one of the key words are phrases are selected for retrieval according to step 1506.

According to one or more embodiments, other key words and phrases used in the application of a relevancy filter, as part of step 1506, are identified for each feature presentation candidate. As has already been discussed in connection with FIG. 6, a substantial amount of information pertaining to each feature presentation title is centrally stored and available for use in identifying and selecting messages. In addition to the tabulated data exemplified by FIG. 6, key words and phrases including the names of actors and actresses, directors, scene locations, products placed in a particular scene at a particular time, and the like, are stored and indexed in a database of central server 202 (FIG. 2A). According to some embodiments, those messages received at step 1504 which include one or more of the feature presentation key words are determined to satisfy the relevancy filter and are included in those selected at step 1506.

According to one or more embodiments, other key words and phrases used in the application of a relevancy filter, as part of step 1504, are identified as having high relevance to one or more socio-demographic group projected to have higher representation in a particular preshow audience based on the feature presentation to follow. As has already been discussed in connection with FIG. 6, a substantial amount of information pertaining to each feature presentation title is centrally stored and available for use in identifying and selecting messages. In addition to the tabulated data exemplified by FIG. 6, key words and phrases having high relevance to members of the socio-demographic group(s) are stored and indexed in a database of central server 202 (FIG. 2A). The key words may be obtained from a variety of sources. In some embodiments, key words are selected and updated dynamically based how often they appear in social network messages originated by members of the applicable socio-demographic group(s). In an embodiment, the key words are included if they occur in messages at a frequency above a predetermined threshold. In another embodiment, the key words are included if they occur in messages at a frequency which is an n-multiple of an average word frequency, wherein n is an integer greater than 1. In both embodiments, commonly used words (e.g., "the", "and", "that", and the like) are excluded from the frequency computation(s). According to some embodiments, those messages received at step 1504 which are determined to include one or more socio-demographically relevant words are determined to satisfy the relevancy filter and are included in those selected at step 1506.

According to one or more embodiments, an audience rating value applied to social network messages previously presented to other audiences is utilized as an inclusionary or an exclusionary filter, during the performance of step 1504 of method 1500. A positive audience rating value suitable for use in the relevancy filter applied during step 1506 includes, for example, a numeric score in the form of a number of "likes" or "thumbs up" awarded by members of a prior audience. Most relevant to an audience of a current pre-show might be the ratings or scores awarded by members of an audience who have already seen the same feature presentation or who have already participated in or watched one of the games scheduled for (or being currently projected to) the game panel of the preshow. Likewise, a negative audience rating value suitable for use in the relevancy filter applied during step 1506 includes, for example, a numeric score in the form of a number of "dislikes" or "thumbs down" awarded by members of a prior audience. According to some embodiments, those messages received at step 1504 which are determined to possess an audience measurement score in excess of a predetermined a threshold are determined to satisfy the relevancy filter and are included in those selected at step 1506.

Representative examples of variable relevancy criteria for use in excluding messages received at step 1504 from a subset of messages identified for presentation to the audience, according to one or more embodiments, include geographic remoteness of the message originator (or a location identified in the message) to the location of the group display screen (e.g., outside a pre-defined radius), the absence of a key word, in a message identified as being relevant to the feature presentation, the absence of a key word identified as being relevant to content being currently presented to a different panel of the projected pre-show display (e.g., an instantiation of a multi-player game being played or watched by members of the audience), and the absence of a key word identified as being relevant to a projected socio-demographic profile of the feature presentation audience.

According to some embodiments, a feature presentation exhibitor pre-defines certain words or phrases as being "off-limits" so far as projection to applicable group display screens is concerned. Examples include mentioning the name of a competing venue, disparaging terms used in combination with a product offered by the feature exhibitor, a sponsor, or one of its business partners. In this regard, some embodiments provide an exhibitor with options for greater control over the messages which might otherwise be accepted for presentation to a group display screen. In one such embodiment, the filtered content is forwarded to a work station monitored by a member of the exhibitor's staff. Using a user interface associated with the local server 204 (FIG. 2A), the member of staff can view the flow of messages as they exit the relevancy filtering step 1506 and tag any messages for removal before they can be forwarded for projection to a screen. A time delay of, for example, 1-3 minutes can be included for this purpose.

In some embodiments, the step 1506 is performed to select messages for projection to a group display screen, while a modified filter or no filter at all is performed when selecting messages for transmission to any mobile terminal devices executing the adjunct client application. Thus, certain messages which might otherwise be omitted from projection to a group display screen might still be viewed by a mobile terminal user. In one embodiment, a user may establish a user profile including a list of user names comprising a buddy, wherein messages from a message originator appearing in a user's buddy list are received for display by the user's mobile terminal, even if some or all of those same messages were removed from the group display screen. In a variation of this embodiment, messages which might otherwise be removed by operation of the relevancy filter at step 1506, are retained for forwarding and projection to the group display screen (i.e., the relevancy filtering operation is "bypassed") so long as the message was contributed by an author who is a member of a buddy group of any member of the pre-show audience.

In any event, and with continued reference to FIG. 15, the method 1500 advances to step 1508, where a social context filter is applied to the subset of messages identified as being relevant, to an audience with visible access to a group display screen during a preshow, according to some embodiments. Representative examples of social context filtering criteria, for excluding messages from a subset identified and selected for presentation to the audience according to one or more embodiments, include the presence of key words identified a priori as being unacceptable to potential members of a pre-show audience based on the rating applicable to the feature presentation it precedes. In some embodiments, a set of words deemed so universally vulgar or offensive that their appearance in a message results in rejection of that message for projection to any group display screen. Such messages are not stored and are not forwarded for projection or display.

The process advances to step 1510. At step 1510, messages filtered for both relevancy and social context are forwarded for rendering to one or more group display screen(s) and to mobile terminals executing the social network interface of the adjunct client application.

According to some embodiments, advertising messages are selected, arranged and presented to all members of a group, via a social network panel projected to a group display screen. To this end, method 1500 proceeds to step 1512 where advertising messages are selected and scheduled for presentation to a preshow audience. Each advertising message observes any applicable character limit, but can include a uniform resource locator (URL) which enables the user to open an html page containing supplementary information or, in some embodiments, a coupon which can be redeemed. By way of example, the coupon may enable the mobile terminal user to make a discounted concession purchase in an e-commerce transaction. According to an embodiment, instructions for invoking an e-commerce order entry component of the client application to consummate a discounted concession purchase are included in the advertising message, or on a web page corresponding to a URL embedded therein.

According to some embodiments, advertising messages are identified and selected, during step 1512, by reference to the socio-demographic information available for the feature presentation which is preceded by the preshow. As an example, and with momentary reference to the exemplary data tabulated FIG. 6, it may be determined that the feature presentation has a very high ration of children to adults as is the case, for example, with feature presentation $M_9$. In this instance, an advertisement for a toy, perhaps even for toy merchandise associated with the feature presentation itself (e.g., an action figure), may be selected and presented by projection to the group display screen.

In some embodiments, advertising messages identified and selected for projection to the group display screen are also displayed by mobile terminals executing the social networking feature of the adjunct client application. According to some embodiments, targeted advertising messages are also identified for presentation to such mobile terminal users. To this end, method 1500 proceeds to step 1514 where advertising messages are selected and scheduled for targeted presentation to specific mobile terminals but not to a preshow audience as a group. As before, each advertising message observes any applicable character limit and can include a uniform resource locator (URL) which enables the user to open an html page.

In some embodiments, the targeted advertising message(s) intended for a particular user's mobile terminal are sent during a preshow and, as well, after the conclusion of the feature presentation. In the former case, step 1514 includes evaluating the user profile of a user which, in an embodiment, includes one or more socio-demographic characteristics of the user (e.g., gender, age group, neighborhood), and a record of the user's history of purchases made via the client application as, for example, theater concessions, mobile device games and applications, sound tracks associated with a movie, and the like. In this way, customized offers fulfilled by the concession operation of an exhibitor are extended to users on an individual basis. In the latter case, step 1514 includes referencing the same socio-demographic characteristics as before, but also takes into consideration aspects of the feature presentation. For example, in a romantic comedy, particular articles of footwear and clothing worn by one of the star performers may be offered to selected members of the audience immediately after a movie. In an embodiment, a targeted advertisement incorporates a link (URL) or thumbnail image which includes a screenshot of the scene showcasing the particular article. Such advertising, which further includes a link to an e-commerce site where the article is available for purchase, may be especially effective immediately after a movie, particularly if the recipient of the message has a distinct recollection of the subject article(s). Similar offers may be made with respect to music played during a game or feature presentation.

In each of steps 1512 and 1514, respectively identified ad messages are scheduled for presentation as group display ads and targeted display ads, as the case may be. From step 1514, the method 1500 advances to determination step 1516. At step 1516, method 1500 determines whether or not a group display ad is presently scheduled for projection to the group display screen. If so, at step 1518 the method forwards the group advertising message(s) for rendering to one or more group display screens. With momentary reference to FIG. 2B, for example, messages are received at a client assembly server (e.g., server 240) which renders, to an associated projector, the messages comprising the social network panel of a preshow display. If not, at determination step 1520, it is determined whether a targeted display ad is presently scheduled for projection to the group display screen. If so, method 1500 forwards, at step 1522, a targeted advertising message to each mobile terminal executing the social network interface of the client application. If not, the process advances to step 1524. At step 1524, the method determines whether or not a preshow session is over. If so, the process terminates at step 1526. If, however, the session is not over, then the method returns to step 1504, to continue receiving, identifying and arranging social network and advertising messages as part of an interactive preshow.

Figure 16:
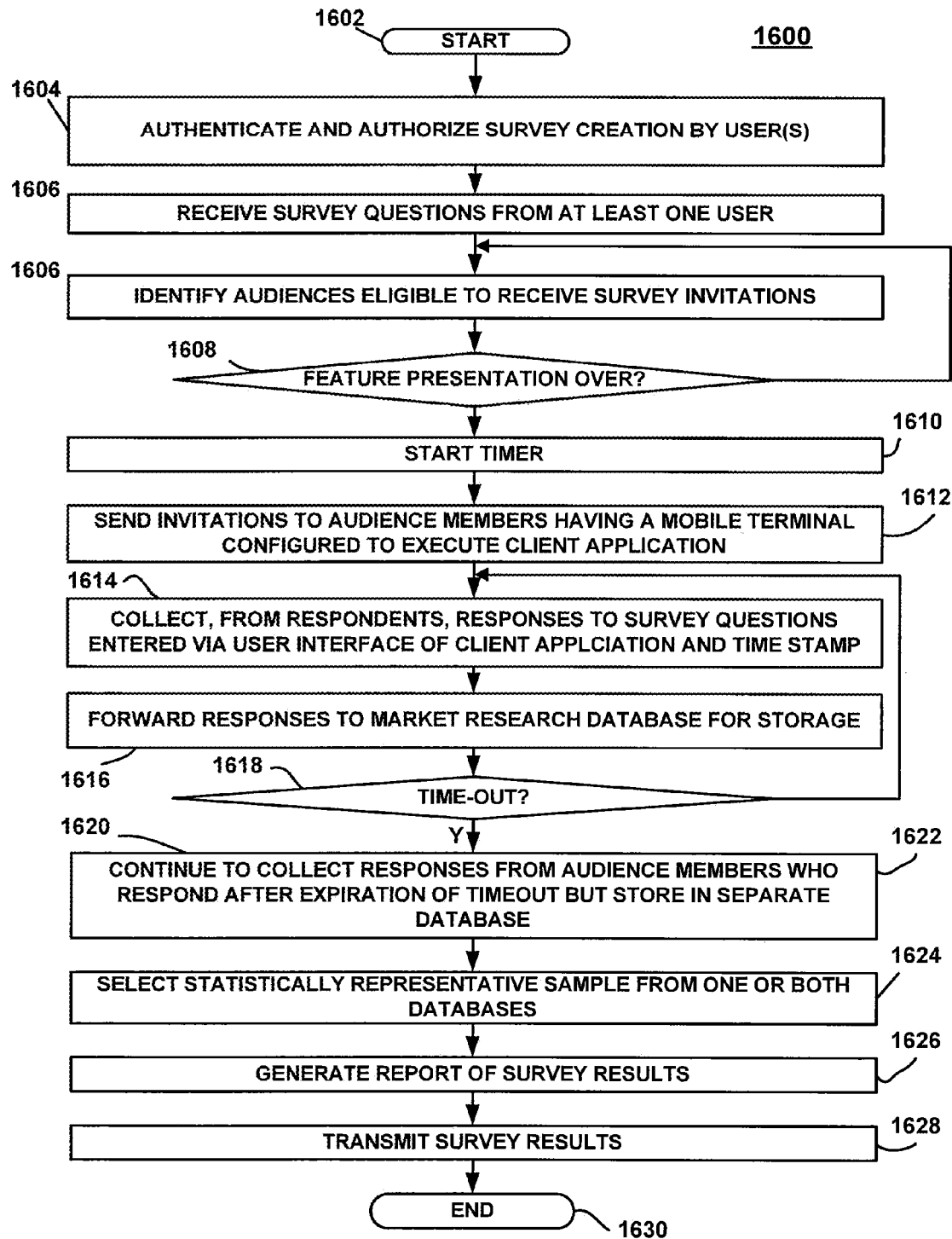
FIG. 16 is a flow diagram of a process for performing market research utilizing a system configured to arrange and present interactive preshow sessions to one or more audiences of a single theater, according to one or more embodiments.

FIG. 16 is a flow diagram of a method 1600 for performing market research utilizing a system configured to arrange and present interactive preshow sessions to one or more audiences of a single theater, according to one or more embodiments. Surveys are sent to one or more groups of uses according some embodiments. One group receiving a survey according to some embodiments include those who have used a mobile terminal device to participate in a pre-show session game, as well as those who watched the game being played by others during a pre-show session. In an embodiment, users who downloaded a full commercial version of a game, as compared to a limited "trial" version adapted for presentation in a preshow session, are invited to participate in the same or a different survey than the other mobile terminal users identified above. In some embodiments, surveys are forwarded to all individuals who have seen a feature presentation and possess a mobile terminal configured to receive an invitation to become a survey respondent and to invoke a survey response interface of the client application.

In an embodiment, launch of the application presents the user with a series of menu choices including (1) participating in a pre-show game via a game player option (2) creating, posting and reviewing social network messages via a social network interface, (3) ordering items via an e-commerce transaction interface, and (4) participating in a survey via a survey response interface. According to some embodiments, the invitation is sent as soon as the point in time at which the featured content was scheduled to end. In other embodiments, however, the invitation is before or after that scheduled end point. In the former case, an invitation is sent prior to the feature ending time only if the system determines that the mobile terminal of the prospective respondent was in the theater for at least a predetermined or selectable interval in excess of the pre-show (e.g., 1 hour or more) or a predetermined or selectable percentage of the total movie duration (e.g., from 35% to 100% of the total duration of the movie and/or pre-show).

In some embodiments, the timing of the invitation and/or submission requested response is determined by the expiration of a countdown timer. In the former case, the timer begins from the scheduled end time of the movie or other featured content. By way of example, the countdown to sending the invitation may be from 0 to 120 minutes from the point at which film credits are projected to the applicable group display screen.

An invitation to respond to a survey may be sent by e-mail, an SMS text message, or even as a post to the "wall" frame of a social networking application. In one or more embodiments, the client application downloaded to and executing on the user's mobile terminal is used to invoke a survey screen. The survey questions are uploaded by a content provider, exhibitor, advertiser, or other interested part via a workstation (not shown) communicatively coupled by the communication network 262 to the central administration server. Survey responses entered via the client application are collected and, optionally, anonymized by assignment of a unique identifier from which the identity of a user cannot be derived. The anonymized or non-anonymized responses are stored in a market data database of central server 202 (FIG. 2A) in connection with various socio-demographic data associated with the user.

To the extent interested parties (e.g., content providers and advertisers) may place a higher value is placed on fresh recollections, an incentive in the form, for example, as a coupon redeemable for merchandise and/or award points redeemable for future game participation, is awarded in some embodiments. In some embodiments, the incentive applies when the user makes a valid response to an invitation prior to expiration of a predetermined interval as, for example, 15 to 40 minutes from transmission or receipt of the invitation. By way of alternate example, the invitation may define an expiration time measured from a point coinciding with or shortly after the end of the feature presentation. As used herein, a response to a survey means that the user has either clicked on a link, as contained in a transmitted invitation, or invoked the survey module of the client application. A response is deemed valid by the survey module if the survey, once begun by the user in the foregoing manner, is completed during one session.

The method 1600 is entered at step 1602 and proceeds to step 1604, where a user desiring to create a survey and solicit enrollment of respondents is authenticated and authorized to do so. Typically, this involves a conventional authentication process in which the user sends credentials such as a user name and password. In an embodiment, if the user is determined to possess the correct credentials for accessing a survey credential creation program executing at a central server, authorized access is granted and the process advances to step 1606. At step 1606, the method 1600 receives a collection of survey questions from at least one user. A single survey can include questions created and submitted by more than one authorized user. As one example, a survey can include any combination of the following: one or more questions submitted by the developer of a first game presented during a preshow, one or more questions submitted by the developer of a second game presented during the preshow, one or more questions submitted by the producer or distributor of the feature presentation, one or more questions submitted by advertisers, and one or more questions submitted by the feature content exhibitor as, for example, the operator of a movie theater, Method 1600 proceeds to step 1607, where audiences are identified as being relevant to a survey. Relevance, with respect to an audience, refers to whether or not all of the questions of a survey are applicable to that audience. Where a survey has already been constructed and the same set of questions must be asked of all respondents in a particular order, method 1600 excludes certain audiences at step 1607 if one or more of the questions do not apply. By way of illustration, a question pertaining to a game that was not played in a preshow session, or to a different feature presentation than the one seen by an audience, is not applicable to that audience and exclusion from participation is appropriate. In other embodiments, method 1600 constructs a survey from questions received at step 1606 constructed after one or more audiences are identified.

Method 1600 proceeds to determination step 1608, where the method determines if a feature presentation is over. If so, a timer is started at block 1610 and invitations are sent to prospective respondents. If not, the process returns to step 1607 to identify any other potential audiences. The selection of respondents of an audience, to whom invitations to participate in a survey, depends upon the survey methodology being employed. In some embodiments, a pure "opt-in" model is adopted wherein all individuals having a mobile terminal configured with a client application are invited to participate. In some embodiments, the invitations are sent, at step 1612, as an e-mail or SMS message and include a URL by which the user opens a web page for providing the applicable responses. In other embodiments, the responses are furnished via a survey interface of the client application. At step 1614, the method collects the responses from the respondents and, at step 1616, forwards them to a market research database for storage. The process proceeds to determination block 1618.

At determination block 1618, method 1600 determines whether or not a deadline set for response to the survey has been reached. In some embodiments, a high value is placed on fast responses so a time out period is used for the purpose of enabling sensitivity to timeliness when evaluating survey results. Incentive award points, as described elsewhere in this specification, are awarded to respondents to encourage such responsiveness. If the method determines at step 1616 that a cut-off or time out has not yet been reached, the process returns to step 1614. If, however, the cut-off is reached, then the process advances to step 1620. At step 1620, in some embodiments, method 160 continues collecting responses from respondents after the cut-off or time out period which began counting down at step 1610. While there may be preference for quick survey response time, even delayed responses may have significant value to the submitter of one or more survey question(s). Thus, in some embodiments, method 1600 time stamps all of the responses collected at 1614 and 1622. In some embodiments, the latter responses are stored in a separate database and in others they are combined in one storage location.

At step 1624, a statistically representative sample of a relevant population, reflecting, for example, a projected socio-demographic composition of an audience, is selected by reference to a centrally stored user profile corresponding to each user. The process proceeds to step 1626, where a report of the survey results are generated at the request of a user or are made available to all users on a syndicated (subscription basis). At step 1628, the generated survey report is transmitted to one or more users. The process then terminates at step 1630.

Figure 17:
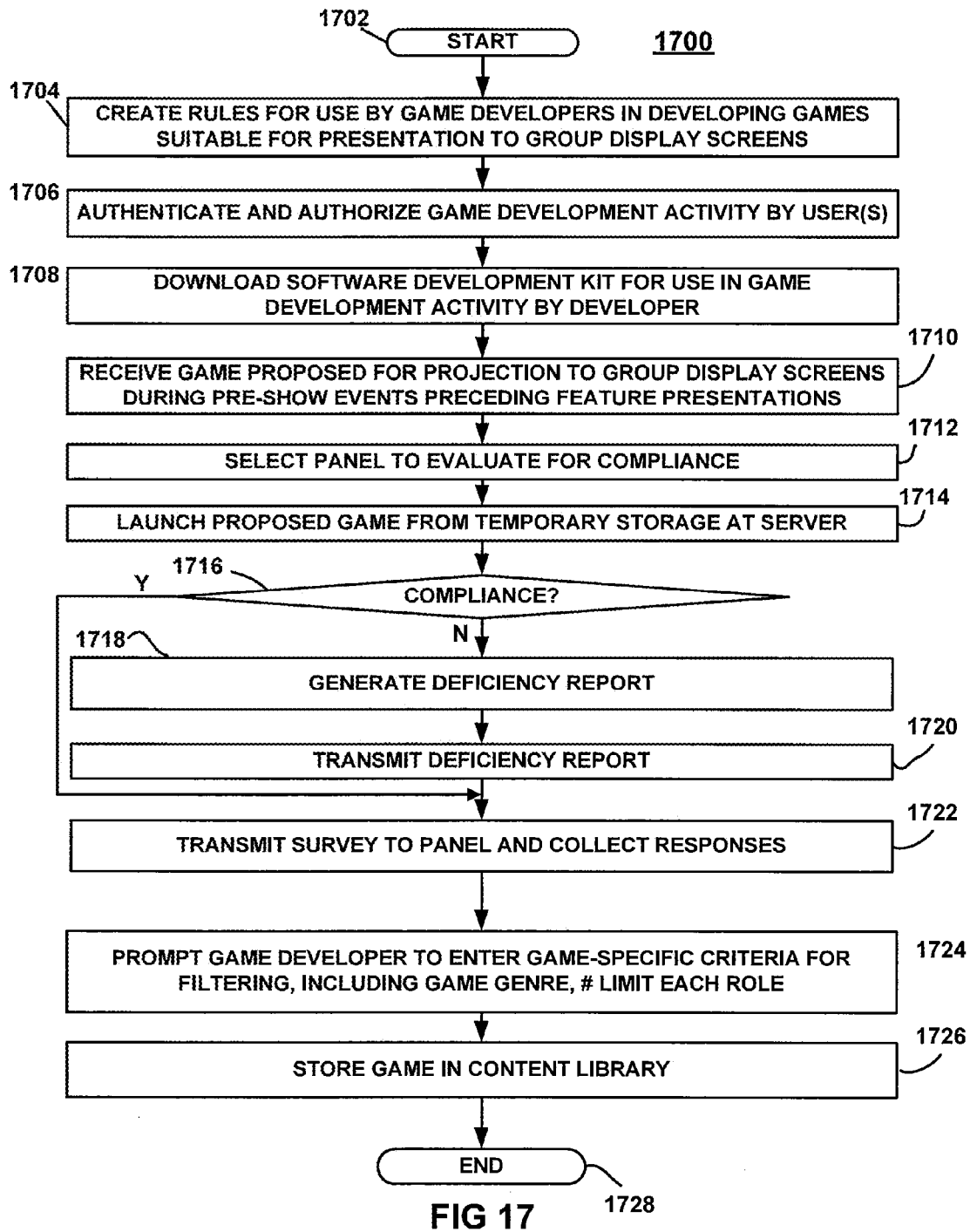
FIG. 17 is a flow diagram of a process for facilitating the development, market testing and commercial launch of programs executable on a mobile terminal or other device characterized by a display and user interface, according to one or more embodiments.

FIG. 17 is a flow diagram of a method 1700 for facilitating the development, market testing and commercial launch of programs executable on a mobile terminal or other device characterized by a display and user interface, according to embodiments. In some embodiments, a suite of development tools, source code, and instructions are provided as a software development kit (SDK) to facilitate the rapid development and commercial introduction of new games. In some embodiments, these tools facilitate the development of new games or the customization or modification of pre-existing games so as to make them suitable for presentation to audiences as part of an interactive pre-game session. T Method 1700 starts at step 1702 and proceeds to step 1704, where a set of rules, for use by game developers in developing games suitable for presentation to group display screens according to embodiments, are defined. In some embodiments the rules defined at step 1704 include a set of available instructions or touch screen input commands which can be received from the mobile terminals of active game participants and processed within a multiplayer game environment, the maximum latency associated with such steps as sending a command from an active player's terminal over a local wireless network, receiving the command at a game server, updating the game environment to reflect execution of the received instruction or command, and transmitting any haptic feedback from the game server back to the user. In some embodiments, rules defined by method 1700 at step 1704 include a minimum number of simultaneous active competitors which must be accommodated during a local multiplayer game instantiation, a minimum number of administrator roles, a limit on the amount of time needed to complete one "round" or level of a game, and a limit on the number of rounds or levels which can be played during an instantiation of a game.

The process proceeds to step 1706, where a game developer enters an authentication and authorization process by furnishing user credentials such as user name and password. In an embodiment, the game developer signs onto a server to request access to game development resources, including a library containing an API for accessing the multiplayer game server environment. Typically, the user credentials include a user name and password, which are checked against credentials forming part of a user account record established during a prior registration process. In some embodiments, the game developer is provided with the set of rules defined at step 1704 as part of the aforementioned registration process. At the successful completion of the authentication and authorization step 1706, the process advances to step 1708.

At step 1708, the method 1700 downloads elements of the software development kit, including one or more libraries, command sets, and other resources useful in the development of games adapted for execution in a multiplayer gaming environment. In some embodiments, the multiplayer game server which hosts the gaming environment is configured to accept a default set of commands and instructions from games developed for the Google Android and Apple iPhone and iPad user environments. Such embodiments are especially well suited to situations where the game developer is almost ready to launch a commercial version of a game but wishes, before doing so, to engage in pre-launch market acceptance testing, market research, test marketing, or even develop a "buzz" in a community of users before committing to a full scale launch. In this case, a game developer need only modify the pre-existing game so as comply with the rules identified in step 1704, thereby creating a "preshow demo" version of the game. As part of an interactive preshow session, the demo version is downloaded, in some embodiments, to the mobile terminals of the active participants.

The process 1700 advances to step 1710, where a game developer submits a game for evaluation as a candidate for inclusion in an interactive preshow according to embodiments. The game is stored in a temporary database associated with a "test bed" designed to emulate the group display screen environment. According to embodiments, test bed environment includes all of the components shown in FIG. 2A, i.e., a game server, wireless local area network for communicatively coupling one or more terminals to the game server, and a client assembly including a server configured to render the game instantiation to a projector, as well as the projector and group display screen.

In some embodiments, a review panel is entrusted with the task of evaluating a game for compliance with the rules defined at step 1704 is recruited from a pool of qualified game evaluators. In some embodiments, one or more reviewers receive compensation and, in exchange, must supply their availability, by the hour and day so that a game evaluation can be automatically scheduled, by execution of an automated scheduling program, according to embodiments of method 1700. Each reviewer possesses, in some embodiments, a mobile terminal configured to execute the client application. In some embodiments, the panel includes only a single "expert" evaluator, who is familiar with the rules to which all games must adhere. In other embodiments, a multiple member panel led by such an expert is recruited for each evaluation. The process of selecting a panel to evaluate games for compliance is performed by method 1700 at step 1712.

In some embodiments, the testing of games submitted for evaluation is conducted at movie theaters, rather than a dedicated test bed facility. In this instance, at least some members of an evaluation panel are compensated for their time or offered incentive award points which can be redeemed for merchandise, priority in the participant selection process during a game show, or other suitable rewards. In some embodiments, a panel is selected automatically through execution of an automatic recruitment program. Each person owning a mobile terminal configured to execute the client application and, in some embodiments, a "preshow session demo game" submitted for evaluation, submits their hourly availability to the recruitment program. Also submitted are hours of theater availability defining when a theater and personnel are available for game testing. The automatic recruitment program selects the time and place of game evaluation, as well as the number and order of game(s) to be evaluated.

At step 1714, a game uploaded by a game developer is received at a test bed or a local game server and is stored pending completion of an evaluation. One or more members of an evaluation panel compete in a multiple player game, and the process proceeds to step 1716. At step 1716, method 1700 receives and stores the results of the evaluation. If the data collected and evaluated by method 1700 at step 1716 results in a determination that the candidate game is not in compliance, the process advances to step 1718 and method 1700 generates a deficiency report which, at step 1720 is transmitted automatically to the game developer and other stakeholders. At the conclusion of step 1720, or if the outcome of the evaluation at step 1716 is favorable, a survey requesting more information relating to the game is transmitted at step 1722. In some embodiments, the panel recruited for evaluation at step 1712 is sufficiently larger and socio-demographically representative of the target customer base as to provide additional details of interest to a game developer. Alternatively, a separate panel is recruited or a survey is sent to members of all audiences who played the pre-show demo version of the subject game as part of a preshow session. Once method 1700 receives an indication that the game has been approved, a game developer (or one or more members of an evaluation panel) is prompted at step 1724 to enter game specific criteria for use in game selection (filtering) including, for example, game genre, the number of participants assignable to each role of the game, and the like. At step 1726, an approved game is automatically transferred from temporary storage to a game content library, thereby becoming eligible for inclusion in any pre-show session according to various embodiments described herein. Thereafter, the process 1700 is terminated at block 1728.

The embodiments of the present invention may be embodied as methods, apparatus, electronic devices, and/or computer program products. Accordingly, the embodiments of the present invention may be embodied in hardware and/or in software (including firmware, resident software, micro-code, etc.), which may be generally referred to herein as a "circuit" or "module". Furthermore, embodiments of the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of embodiments of the present invention may be written in an object oriented programming language, such as Java®, Smalltalk or C++, and the like. However, the computer program code for carrying out operations of embodiments of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit embodiments of the invention to the precise forms disclosed. Many modifications and variations are possible in view of the above teachings. The embodiments were chosen and described in order to best explain the principles of the present disclosure and its practical applications, to thereby enable others skilled in the art to best utilize embodiments of the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method comprising:
    receiving a first request to schedule a first pre-show event to precede projection of a first feature display content to a group display screen, wherein the first request includes information associated with at least one of the first feature display content, the group display screen, the first pre-show event, or an audience of the first feature display content;
    identifying, based on information provided in the first request, at least one multiplayer game from a plurality of multiplayer games available from a game server;
    projecting to the group display screen, using a projector communicatively coupled to the game server, a real-time instantiation of the multiplayer game as a portion of the first pre-show event; and
    transmitting, to a mobile terminal of at least one user to whom the group display screen is not visible, instructions executable by a mobile terminal processor to at least one of:
        report a mobile terminal location;
        process user input to specify a requested role for a multiplayer game session;
        process user input to respond to an invitation to participate in a multiplayer game session;
        process user input associated with a role in a multiplayer game session; or
        transition, according to a location of the mobile terminal, to a silent mode of operation to avoid disturbing audience members during a feature presentation.

2. The method of claim 1, wherein the information associated with at least one of the first feature display content, the group display screen, the first pre-show event, or an audience for the first feature display content includes as least one of:
    a location of the group display screen;
    a title of the first feature display content;
    a genre for the first feature display content;
    a rating for the first feature display content;
    a socio-demographic characteristic of an audience for the first feature display content;
    a start time and end time for the first pre-show event; or
    a start time for the first feature display content and a duration of the first pre-show event.

3. The method of claim 1, further including processing a second request received from a mobile communication terminal, for a user of the mobile communication terminal to participate in the real-time instantiation of the at least one multiplayer game.

4. The method of claim 1, further including qualifying a first member of the first feature display content audience, who is a user of a first mobile communication terminal, to participate in the real time instantiation of the multiplayer game using the first mobile communication terminal.

5. The method of claim 4, further including qualifying a second member of the first feature display content audience, whose is a user of a second mobile communication terminal, to participate in the real time instantiation of the multiplayer game using the second mobile communication terminal.

6. The method of claim 5, wherein the group display screen is a screen in a movie theater, the method further including awarding incentive points based on prior purchase transactions completed with the movie theater using a corresponding mobile communication terminal and a processor of each corresponding mobile terminal being configured to execute instructions for both participating in multi-player games during the first pre-show event and initiating a purchase transaction.

7. The method of claim 5, wherein processing the second request to participate includes determining whether at least one of the first member or the second member have accumulated a sufficient quantity of awarded incentive points to participate in the multiplayer game instantiation.

8. The method of claim 7, wherein processing the second request to participate includes completing an e-commerce transaction under which at least one of the first member and the second member is charged a fee for participation if a sufficient quantity of awarded incentive points have been accumulated.

9. The method of claim 1, wherein the first request is received from a first movie theater operator, and wherein the method further includes receiving a third request by a second movie theater operator to schedule the first pre-show event to precede projection of a second feature display content to a second group display screen at the same time the first pre-show event is displayed to the audience of the first feature display content.

10. The method of claim 9, wherein identifying at least one multiplayer game includes selecting at least one multiplayer game which has at least one of a genre rating or a content rating consistent with the first feature display content and the second feature display content.

11. The method of claim 1, wherein identifying at least one multiplayer game includes selecting at least one multiplayer game which has at least one of a genre rating or a content rating consistent with the first feature display content.

12. The method of claim 1, further comprising displaying a list of identified multiplayer game choices to the group display screen, and receiving selections indicating votes from mobile communication terminals of the audience on multiplayer games to be selected for the first pre-show event.

13. The method of claim 1, further comprising transmitting information to a plurality of mobile terminals for enabling display of a countdown to a beginning of a multiplayer game session during the first pre-show event.

14. The method of claim 1, further comprising one of projecting or rendering, to the group display screen, a countdown to at least one of a beginning of a multiplayer game session or a beginning of the feature display content.

15. The method of claim 1, wherein the group display screen is a first group display screen visible only to a first group of audience members located in a first room of a first building.

16. The method of claim 15, further comprising one of rendering or projecting, to a second group display screen visible to a second group of audience members located in one of a first room of a second building or a second room of the first building, display content associated with the multiplayer game instantiation.

17. The method of claim 1, further comprising one of rendering and projecting to the group display screen a number of positions open for audience members to join the multiplayer game.

18. The method of claim 1, further comprising processing a request received from a mobile terminal of a user requesting to participate in a multiplayer game session, wherein the mobile terminal of the requesting user is too far away for the group display screen to be visible to the requesting user.

19. The method of claim 1, wherein the instantiation of the multiplayer game comprising the pre-show event is displayed on both a display of a mobile terminal used by each participant and on the group display screen simultaneously.

20. The method of claim 19, wherein participants in the multiplayer game instantiation participate by reference to their respective mobile terminals rather than by reference to the group display screen.

21. A computer implemented method for enabling members of an audience to participate in a multiplayer game via mobile terminals including a processor, a memory, a display, a wireless transceiver, and a user interface for entry of user input, the method comprising:

receiving a request, from a first mobile terminal of a first audience member, to participate in the multiplayer game;

one of rendering or projecting, to a group display screen, display content associated with the multiplayer game, wherein the group display screen is visible to all members of the audience;

processing, at a game server, user input received from the mobile terminals of the first audience member;

causing the mobile terminal of the first mobile terminal to display a multiplayer game instantiation being concurrently projected to the group display screen; and uploading instructions to a central repository for retrieval by mobile terminals over a public communication network from locations remote to the group display screen, wherein the instructions are executable by a processor of the mobile terminal to at least one of:

report a location of the mobile terminal;

transmit a beacon signal from which the mobile terminal can be located;

process user input to specify a requested role for a multiplayer game session;

process user input to respond to an invitation to participate in a multiplayer game session;

process user input associated with a role in a multiplayer game session; or transition, according to a location of the mobile terminal and a scheduled time for ending a multiplayer game session, to a silent mode of operation to avoid disturbing audience members during one of rendering and projection of featured display content to the group display screen.

22. The method of claim 21, wherein participation in the multiplayer game by the first audience member includes reference to the display of the first mobile terminal rather than reference to the group display screen.

23. The method of to claim 22, further receiving and processing mobile terminal input, from mobile terminals of members of a movie theater audience in proximity to the group display screen, representative of a selection of a multiplayer game to be played before a feature presentation.

24. The method of claim 23, further including transmitting information about each of the multiplayer game choices to the mobile terminals of movie theater audience members.

25. The method of claim 21, further including determining, in a first determining step, a start time of a feature presentation associated with the group display screen;

determining, in a second determining step, a location of at least one mobile terminal; and at the determined start time, transmitting an instruction, to the at least one mobile terminal to transition to a silent mode of operation if the determined location corresponds to a location in visible range of the group display screen.

26. An interactive pre-show entertainment system, comprising:

a base station having a transceiver for receiving user input from a first plurality of mobile terminals each having a processor, a memory containing instructions executable by the processor, and a transceiver, wherein the base station is disposed proximate to at least one group display screen visible to users of at least some of the first plurality of mobile terminals;

a game server communicatively coupled to the base station, a processor of the game server being configured to execute instructions for processing user input received from at least one of the first plurality of mobile terminals to enable a first mobile terminal user to actively compete against at least a second mobile terminal user while looking at the display screen of a respective mobile terminal, generating display content corresponding to an interactive, multiplayer game;

providing generated display content to one of a rendering engine and a projector for one of rendering and projecting the generated content to the at least one group display screen;

providing first generated display content to the first and second mobile terminal to enable participation in the multiplayer game, processing user input associated with a requested non-competitor role in a multiplayer game session, wherein the non-competitor role is one of administrator or intervener;

processing user input received from at least one of third plurality of mobile terminals of administrators to enable a third mobile terminal user to modify a rule that affects all active competitors in a uniform manner in the interactive, multiplayer game;

processing user input received from at least one of fourth plurality of mobile terminals of interveners to enable a fourth mobile terminal user to modify a rule that affects one competitor in the interactive, multiplayer game;

generating display content corresponding to the modified rule in an interactive, multiplayer game;

providing generated display content to one of a rendering engine and a projector for one of rendering and projecting the generated content to the at least one group display screen; and providing first generated display content to the first and second mobile terminal to enable participation in the multiplayer game.

27. The system of claim 26, further including an administration server communicatively coupled to the base station for processing requests by users of the first plurality of mobile terminals to join the same instantiation of a multigame session.

28. The system of claim 26, wherein modifying a rule that affects all active competitors in a uniform manner comprises one or more of replacing a background theme, specifying a game complexity, inserting or removing one or more obstructions in a path navigated in the game by all competitors.

29. The system of claim 26, wherein modifying a rule that affects one competitor comprises one or more of rendering first aid, providing equipment, or moving an obstruction into a path of a competitor.

* * * * *